US012475872B2

(12) United States Patent
Mizuno et al.

(10) Patent No.: US 12,475,872 B2
(45) Date of Patent: Nov. 18, 2025

(54) AUDIO PROCESSING METHOD, AUDIO PROCESSING SYSTEM, AND COMPUTER-READABLE MEDIUM

(71) Applicant: YAMAHA CORPORATION, Hamamatsu (JP)

(72) Inventors: Yoshifumi Mizuno, Hamamatsu (JP); Yu Takahashi, Hamamatsu (JP); Kazunobu Kondo, Toyohashi (JP); Kenji Ishizuka, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 898 days.

(21) Appl. No.: 17/703,697

(22) Filed: Mar. 24, 2022

(65) Prior Publication Data

US 2022/0215822 A1 Jul. 7, 2022

Related U.S. Application Data

(63) Continuation of application No. PCT/JP2020/035723, filed on Sep. 23, 2020.

(30) Foreign Application Priority Data

Sep. 27, 2019 (JP) ................................ 2019-177965
Sep. 27, 2019 (JP) ................................ 2019-177966
Sep. 27, 2019 (JP) ................................ 2019-177967

(51) Int. Cl.
*G10H 3/12* (2006.01)
*G10H 1/00* (2006.01)

(52) U.S. Cl.
CPC ........... *G10H 3/125* (2013.01); *G10H 1/0008* (2013.01); *G10H 2210/056* (2013.01); *G10H 2210/066* (2013.01); *G10H 2250/025* (2013.01)

(58) Field of Classification Search
CPC ................ G10H 3/125; G10H 1/0008; G10H 2210/056; G10H 2210/066; G10H 2250/025

(Continued)

(56) References Cited

U.S. PATENT DOCUMENTS

2006/0153059 A1 7/2006 Spence
2010/0131086 A1 5/2010 Itoyama (Continued)

FOREIGN PATENT DOCUMENTS

JP 2004023623 A * 1/2004
JP 2006510017 A 3/2006

(Continued)

OTHER PUBLICATIONS

English translation of Written Opinion issued in Intl. Appln. No. PCT/JP2020/035723 mailed Dec. 8, 2020, previously cited in IDS filed Mar. 24, 2022.

(Continued)

*Primary Examiner* — Dedei K Hammond
*Assistant Examiner* — Philip G Scoles
(74) *Attorney, Agent, or Firm* — ROSSI, KIMMS & McDOWELL LLP

(57) ABSTRACT

An audio processing method obtains observed envelopes of picked-up sound signals including a first observed envelope representing a contour of a first sound signal including a first target sound from a first sound source and a second spill sound from a second sound source and a second observed envelope representing a contour of a second sound signal including a second target sound from the second sound source and a first spill sound from the first sound source; and generates, based on the observed envelopes, output envelopes including a first output envelope representing a contour of the first target sound in the first observed envelope (Continued)

and a second output envelope representing a contour of the second target sound in the second observed envelope, using a mix matrix including a mix proportion of the second spill sound in the first sound signal and a mix proportion of the first spill sound in the second sound signal.

20 Claims, 13 Drawing Sheets

(58) Field of Classification Search
USPC ........................................................... 84/602
See application file for complete search history.

(56) References Cited

U.S. PATENT DOCUMENTS

2011/0261977 A1* 10/2011 Hiroe .................. G10L 21/0272 381/119
2015/0242180 A1* 8/2015 Boulanger-Lewandowski ............ G06N 3/044 700/94

FOREIGN PATENT DOCUMENTS

| | | | | |
|---|---|---|---|---|
| JP | 2013066079 | A | * | 4/2013 |
| JP | 2014134688 | A | * | 7/2014 |
| WO | 2008133097 | A1 | | 11/2008 |

OTHER PUBLICATIONS

International Search Report issued in Intl. Appln. No. PCT/JP2020/035723 mailed Dec. 8, 2020. English translation provided.
Written Opinion issued in Intl. Appln. No. PCT/JP2020/035723 mailed Dec. 8, 2020.

* cited by examiner

AUDIO PROCESSING METHOD, AUDIO PROCESSING SYSTEM, AND COMPUTER-READABLE MEDIUM

CROSS REFERENCE TO RELATED APPLICATIONS

This application is a Continuation Application of PCT Application No. PCT/JP2020/035723, filed Sep. 23, 2020, and is based on and claims priority from Japanese Patent Application No. 2019-177965, filed Sep. 27, 2019, Japanese Patent Application No. 2019-177966, filed Sep. 27, 2019, and Japanese Patent Application No. 2019-177967, filed Sep. 27, 2019, the entire contents of each of which are incorporated herein by reference.

BACKGROUND

Technical Field

The present disclosure relates to a technology for processing sound signals that are generated by picking up sound from a sound source, such as a musical instrument.

Background Information

When recording the performance sound of a plurality of musical instruments, a separate sound receiving device may be provided for each of the musical instruments. Sound received by a sound receiving device is predominantly sound from a musical instrument for which the sound receiving device is provided, but may also include sound from other musical instruments (referred to as spill sound). Japanese Patent Application Laid-Open Publication No. 2013-66079 (hereafter, "Patent Document 1") discloses a configuration for estimating transmission characteristics of spill sound generated between multiple sound sources and removing from sound received by a sound receiver spill sound from other of the sound sources.

The technology of Patent Document 1 is subject to a problem in that a large processing load is required to estimate transmission characteristics of spill sound occurring between sound sources. On the other hand, cases are assumed in which sound separation for each sound source is not required. In such cases, it suffices if the sound level of each sound source can be obtained.

SUMMARY

In consideration of the above circumstances, an object of one aspect of the present disclosure is to reduce a processing load in obtaining sound levels of sound sources.

In order to solve the above problem, an audio processing method according to one aspect of the present disclosure includes: obtaining a plurality of observed envelopes of picked-up sound signals including a first observed envelope and a second observed envelope, the first observed envelope representing a contour of a first sound signal picked up in a vicinity of a first sound source and the second observed envelope representing a contour of a second sound signal picked up in a vicinity of a second sound source, the first sound signal including a first target sound from the first sound source and a second spill sound from the second sound source; and the second sound signal including a second target sound from the second sound source and a first spill sound from the first sound source; and generating, based on the plurality of observed envelopes, a plurality of output envelopes using a mix matrix including a mix proportion of the second spill sound in the first sound signal and a mix proportion of the first spill sound in the second sound signal, and the generated plurality of output envelopes include: a first output envelope representing a contour of the first target sound in the first observed envelope and a second output envelope representing a contour of the second target sound in the second observed envelope.

According to another aspect of the present disclosure, a computer-readable medium stores a program executable by a computer to execute the audio processing method.

An audio processing system according to still another aspect of the present disclosure includes one or more memories storing instructions; and one or more processors communicatively connected to the one or more memories and that implement the instructions to: obtain a plurality of observed envelopes of picked-up sound signals including a first observed envelope and a second observed envelope, the first observed envelope representing a contour of a first sound signal picked up in a vicinity of a first sound source and the second observed envelope representing a contour of a second sound signal picked up in a vicinity of a second sound source. The first sound signal includes a first target sound from the first sound source and a second spill sound from the second sound source, and the second sound signal includes a second target sound from the second sound source and a first spill sound from the first sound source; and generate, based on the plurality of observed envelopes, a plurality of output envelopes using a mix matrix including a mix proportion of the second spill sound in the first sound signal and a mix proportion of the first spill sound in the second sound signal. The generated plurality of output envelopes include: a first output envelope representing a contour of the first target sound in the first observed envelope; and a second output envelope representing a contour of the second target sound in the second observed envelope.

DETAILED DESCRIPTION

A: First Embodiment

Figure 1:
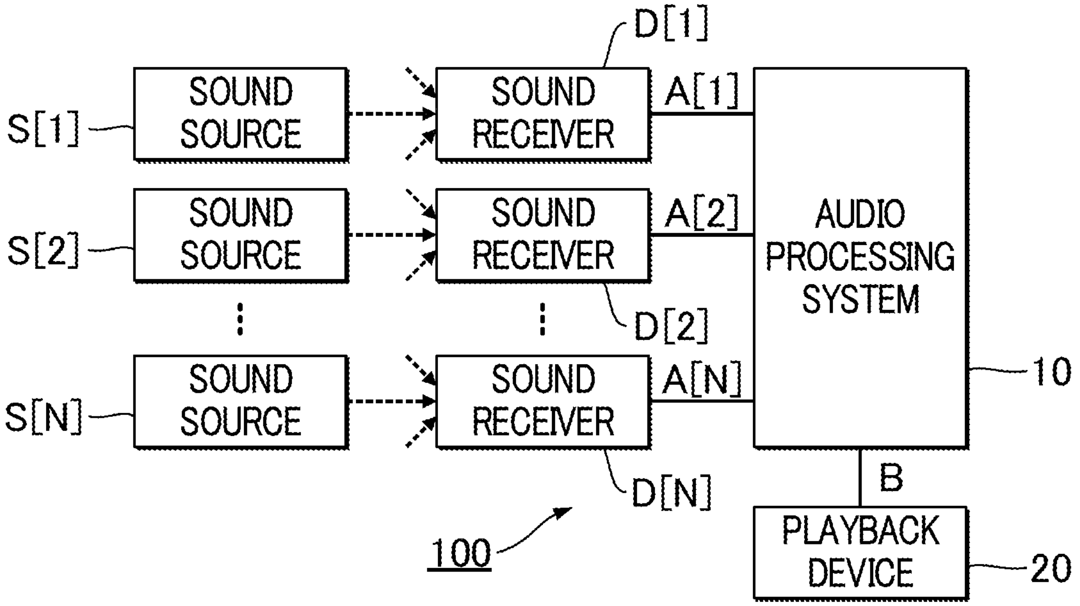
FIG. 1 is a block diagram showing an audio system.

FIG. 1 is a block diagram showing a configuration of an audio system 100 according to a first embodiment of the present disclosure. The audio system 100 is a recording system for music production. The system receives and processes sound generated from N sound sources S[1] to S[N], where N is a natural number greater than or equal to 2. Each sound source S[n] (n=1 to N) is, for example, a musical instrument that produces sound when played. For example, each of a plurality of percussion instruments (e.g., cymbals, a kick drum, a snare drum, a hi-hat, a floor tom, etc.) that make up a drum set corresponds to a sound source S[n]. The N sound sources S[1] to S[N] are installed in close proximity to each other in a single acoustic space. A combination of two or more musical instruments may be used as the sound source S[n].

The audio system 100 includes N sound receivers D[1] to D[N], an audio processing system 10, and a playback device 20. Each sound receiver D[n] is connected either by wire or wirelessly to the audio processing system 10. Likewise, the playback device 20 is connected either by wire or wirelessly to the audio processing system 10. The audio processing system 10 and the playback device 20 may be configured as a single unit.

Each of the N sound receivers D[1] to D[N] corresponds to one of the N sound sources S[1] to S[N]. Thus, the N sound receivers D[1] to D[N] and the N sound sources S[1] to S[N] have a one-to-one correspondence with each other. Each sound receiver D[n] is a microphone that receives sound within the vicinity. For example, the sound receiver D[n] is a directional microphone that is oriented to the sound source S[n]. The sound receiver D[n] generates a sound signal A[n] representative of a waveform of the sound within the vicinity. N-channel sound signals A[1] to A[N] are supplied in parallel to the audio processing system 10.

Each sound receiver D[n] is installed in the vicinity of the sound source S[n] to receive sound generated and output from the sound source S[n](hereinafter, "target sound"). Consequently, the predominant sound that reaches the sound receiver D[n] is the target sound output from the sound source S[n]. However, since each sound source S[n] is installed in close proximity to each other, sound generated and output from sound sources S[n'] (n'=1 to N, n'≠n) contains sound other than that of the sound source S[n] corresponding to the sound receiver D[n] (hereinafter, "spill sound"), which also reaches the sound receiver D[n]. Thus, the sound signal A[n] generated by the sound receiver D[n] although primarily containing target-sound components received from the sound source S[n], also contains spill-sound components received from the other sound sources S[n'] located proximate to the sound source S[n]. For sake of convenience, an A/D converter that converts each sound signal A[n] from analog to digital is not shown in the figure.

The audio processing system 10 is a computer system for processing N-channel sound signals A[1] to A[N]. Specifically, the audio processing system processes the N-channel sound signals A[1] to A[N], to generate a sound signal B with a plurality of channels. The playback device 20 reproduces sound represented by the sound signal B. Specifically, the playback device 20 has a D/A converter that converts the sound signal B from digital to analog, an amplifier that amplifies the sound signal B, and a sound outputter that outputs sound in accordance with the sound signal B.

Figure 2:
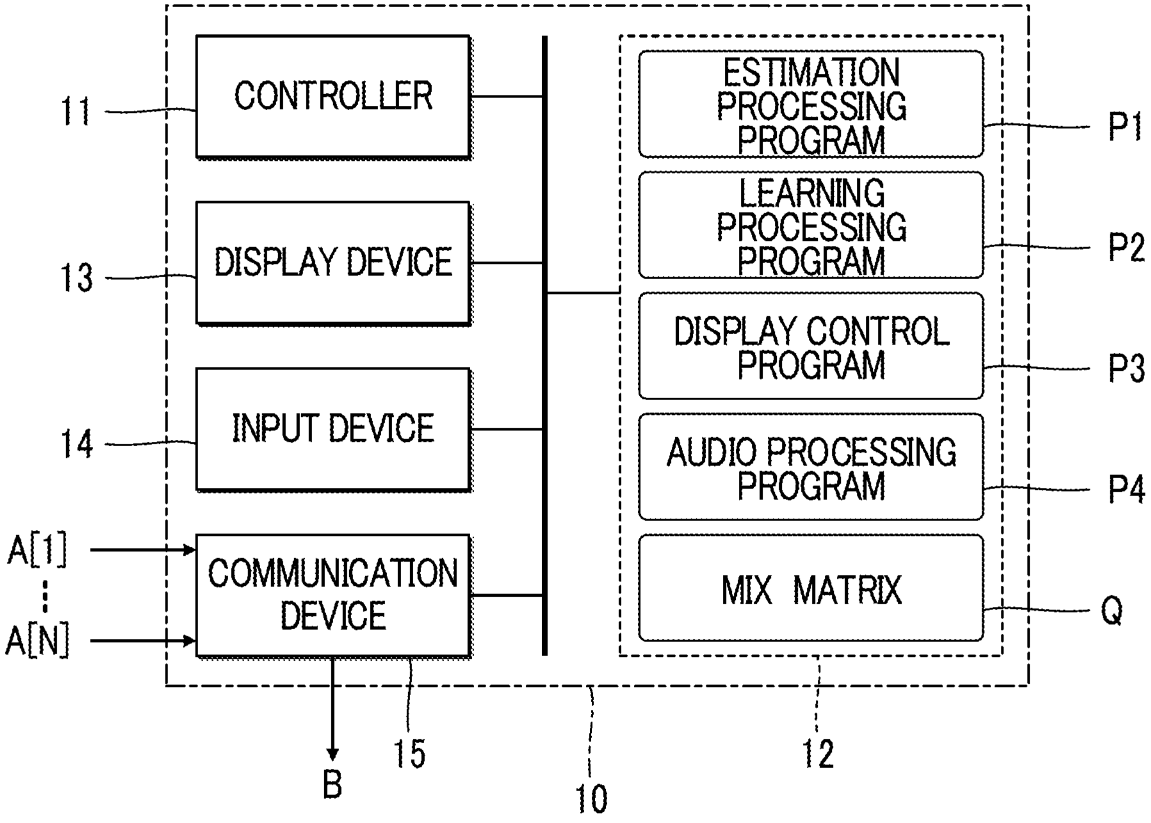
FIG. 2 is a block diagram showing a configuration of an audio processing system.

FIG. 2 is a block diagram showing a configuration of the audio processing system 10. The audio processing system 10 is realized by a computer system provided with a controller 11, a storage device 12, a display device 13, an input device 14, and a communication device 15. The audio processing system 10 can be realized either by use of a single device, or by use of multiple devices that are configured separately from each other.

The controller 11 is constituted of one or more processors, and controls each element of the audio processing system 10. For example, the controller 11 is constituted of one or more types of a Central Processing Unit (CPU), a Sound Processing Unit (SPU), a Digital Signal Processor (DSP), a Field Programmable Gate Array (FPGA), or an Application Specific Integrated Circuit (ASIC). The communication device 15 communicates with the N sound receivers D[1] to D[N] and the playback device 20. For example, the communication device 15 has an input port to which each of the sound receivers D[n] is connected and an output port to which the playback device 20 is connected.

The display device 13 displays images under control of the controller 11. The display device 13 is, for example, a liquid crystal display panel or an organic EL display panel. The input device 14 receives input from the user. The input device 14 is, for example, a touch panel that detects user-contact with the display surface of the display device 13. The input device 14 may be an operator operated by the user.

The storage device 12 is constituted of one or more memories for storing programs that are executed by the controller 11, and for storing data used by the controller 11. Specifically, the storage device 12 stores an estimation processing program P1, a learning processing program P2, a display control program P3, and an audio processing program P4. The storage device 12 is constituted of a known recording medium, such as a magnetic recording medium or a semiconductor recording medium, for example. The storage device 12 may be constituted of a combination of a plurality of types of recording media. A portable recording medium that is detachable from the audio processing system 10, or a separate recording medium (e.g., online storage) with which the audio processing system 10 can communicate may be used as the storage device 12.

Figure 3:
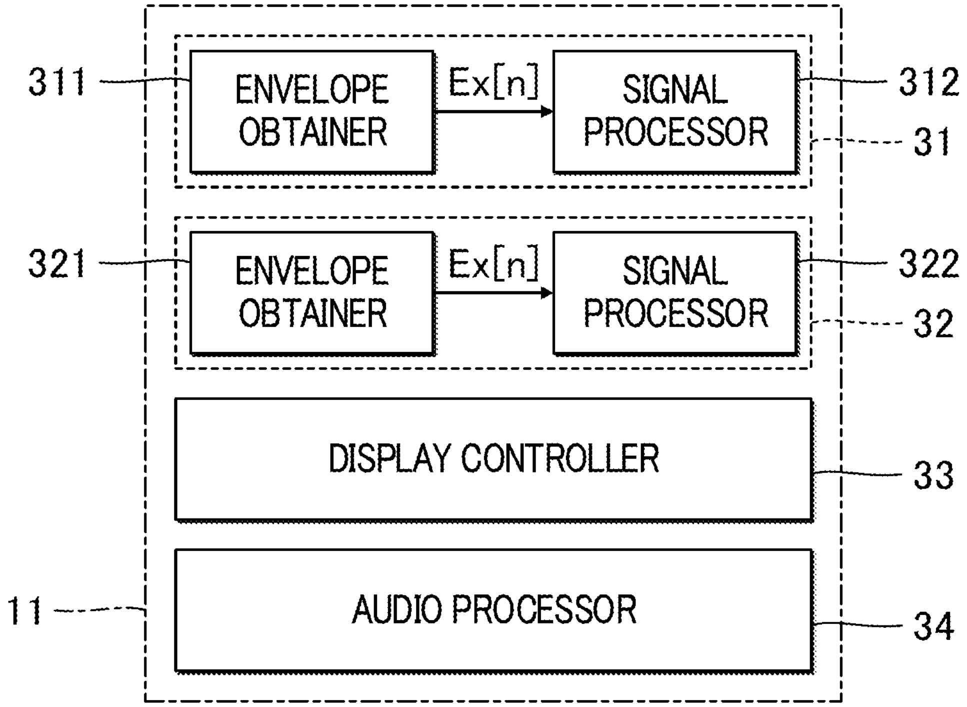
FIG. 3 is a block diagram showing a functional configuration of a controller.

FIG. 3 is a block diagram illustrating a functional configuration of the audio processing system 10. The controller 11 executes the programs stored in the storage device 12 to realize a plurality of functions (an estimation processor 31, a learning processor 32, a display controller 33, and an audio processor 34). Each of the functions realized by the controller 11 is described in detail below.

1. Estimation Processor 31

The controller 11 functions as the estimation processor 31 by executing the estimation processing program P1. The estimation processor 31 analyzes the N-channel sound signals A[1] to A[N]. In more detail, the estimation processor 31 comprises an envelope obtainer 311 and a signal processor 312.

The envelope obtainer 311 generates an observed envelope Ex[n] (Ex[1] to Ex[N]) for each of the N-channel sound signals A[1] to A[N]. The observed envelope Ex[n] of each sound signal A[n] is a signal within a time domain, the signal representing a contour of a waveform of the sound signal A[n] on a time axis.

Figure 4:
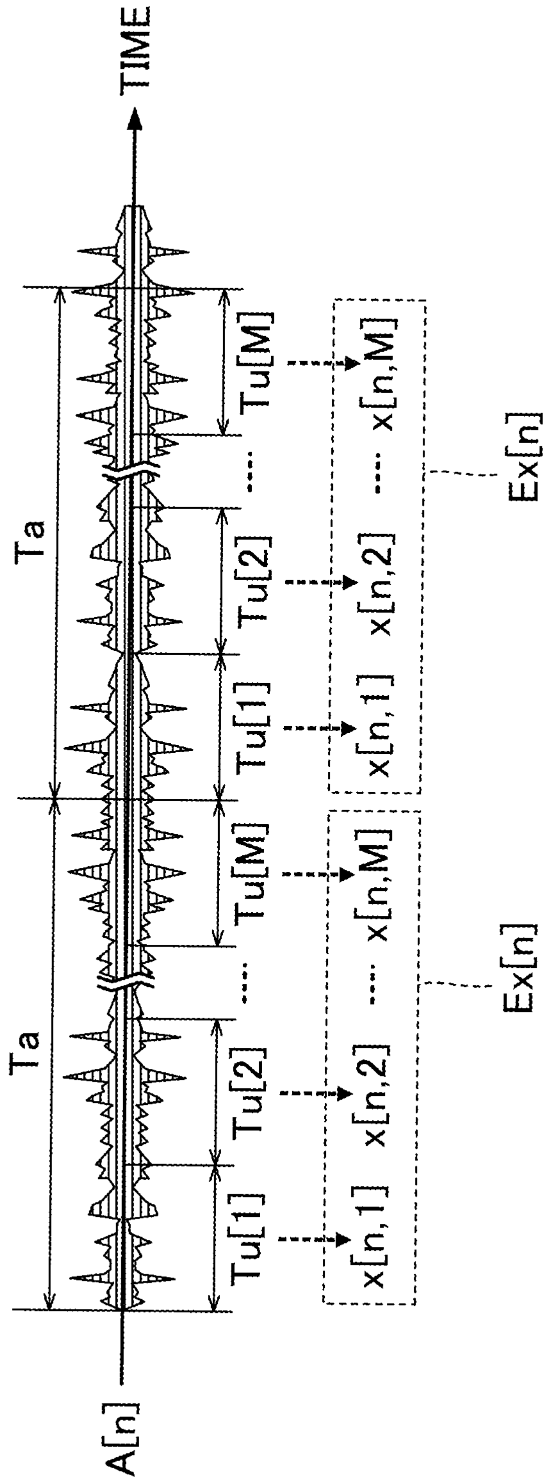
FIG. 4 is an explanatory diagram of an observed envelope.

FIG. 4 is an explanatory diagram of the observed envelope Ex[n]. For each period Ta with a predetermined duration on the time axis (hereinafter, "analysis period"), N-channel observed envelopes Ex[1] to Ex[N] are generated. Each analysis period Ta consists of a series of M unit periods Tu[1] to Tu[M] on the time axis (M is a natural number greater than or equal to 2). Each unit period Tu[m] (m=1 to M) is a period with a duration corresponding to a series of U signal values (U samples) of the sound signal A[n]. The envelope obtainer 311 calculates a level x[n,m] of the observed envelope Ex[n] from the sound signal A[n] for each unit period Tu[m]. The observed envelope Ex[n] of the n-th channel in one analysis period Ta is represented by a series of M levels x[n,1] to x[n,M] in the analysis period Ta. Any one level x[n,m] in the observed envelope Ex[n] is expressed, for example, by the following Equation $$x[n, m] = \sqrt{\frac{1}{U}\sum_{u=0}^{U}(a[n, u])^2}\,. \tag{1}$$

(1)

In the Equation (1), a[n,u] denotes a value of the u-th signal (u=1 to U) among the U signal values a[n,1] to a[n,U] making up the n-th channel in the unit period Tu[m]. As will be understood from Equation (1), each level x[n,m] of the observed envelope Ex[n] is a non-negative effective value corresponding to the Root Mean Square (RMS) of the sound signal A[n]. As will be understood from the above explanation, the envelope obtainer 311 generates, for each unit period Tu[m], a level x[n,m] for each of the N channels, and the series of M levels x[n,m] (levels x[n,1] to x[n,M]) is defined as an observed envelope Ex[n]. Thus, the observed envelope Ex[n] of each channel is represented by an M-dimensional vector with elements corresponding to the M levels x[n,1] to x[n,M].

Figure 5:
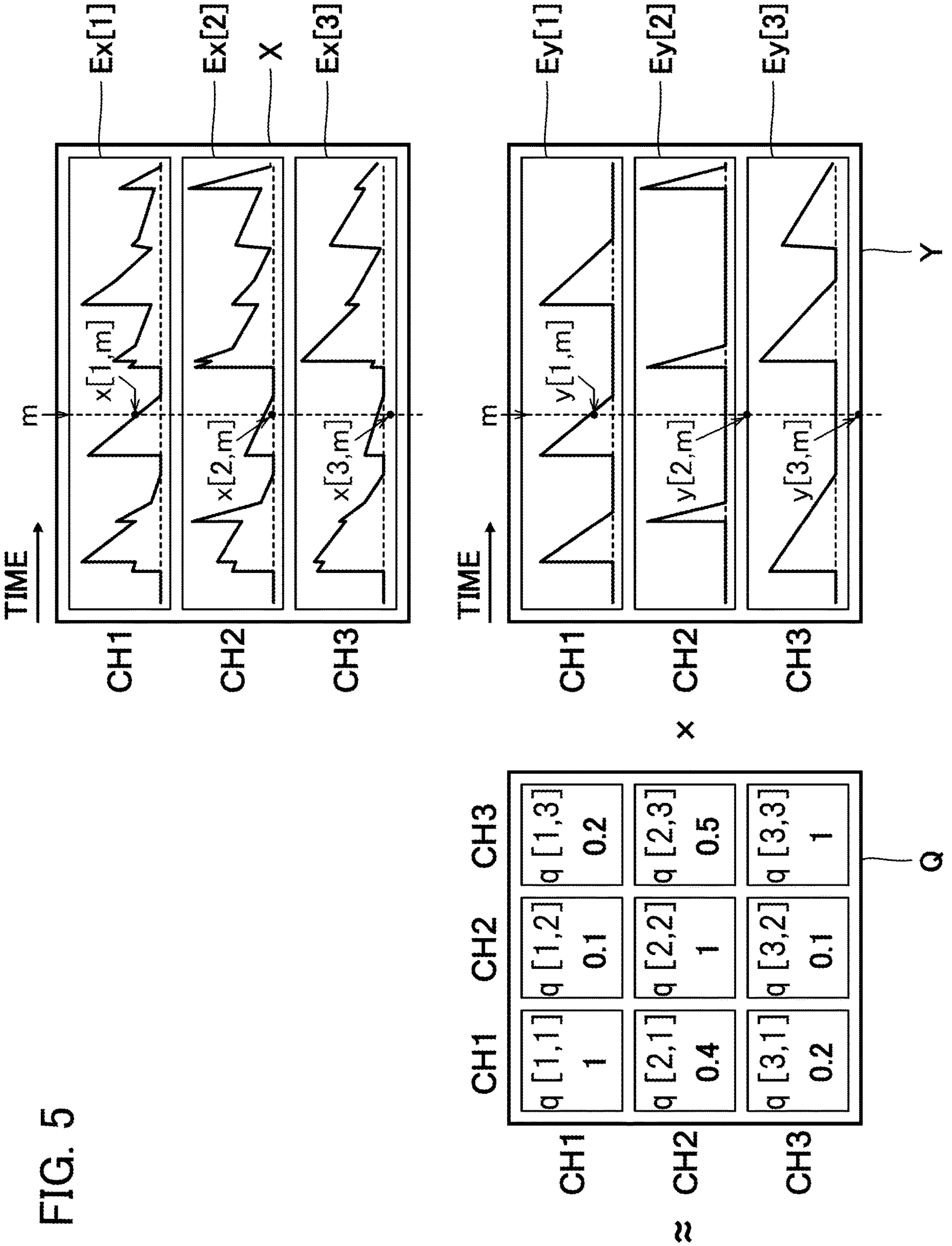
FIG. 5 is an explanatory diagram of estimation processing by an estimation processor.

FIG. 5 is an explanatory diagram of an operation of the estimation processor 31. The observed envelope Ex[n] described above is generated for each of the N-channel sound signals A[1] to A[N]. Accordingly, an N-by-M non-negative matrix (hereinafter, "observed matrix") X with the N observed envelopes Ex[1] to Ex[N] arranged vertically is generated for each analysis period Ta. The element at the n-th row and m-th column in the observed matrix X is the m-th level X[n,m] in the observed envelope Ex[n] of the n-th channel. In each of the subsequent drawings, an example is given of a case where the total number N of the channels of the sound signal A[n] is 3.

The signal processor 312 in FIG. 3 generates N-channel output envelopes Ey[1] to Ey[N] from the N-channel observed envelopes Ex[1] to Ex[N]. As illustrated in FIG. 5, an output envelope Ey[n] corresponding to the observed envelope Ex[n] is a time-domain signal in which the levels of the target sound from the sound source S[n] are emphasized (ideally, are extracted) in comparison with the observed envelope Ex[n]. Thus, in the output envelope Ey[n], levels of the spill sound from each sound source S[n'] other than the sound source S[n] are reduced (ideally, are removed). As will be understood from the above explanation, the output envelope Ey[n] represents how the levels of the target sound generated and output from the sound source S[n] temporally changes. Therefore, according to the first embodiment, an advantage is that a user can accurately perceive a temporal change in a series of levels of a target sound from each sound source S[n].

The signal processor 312 generates the N-channel output envelopes Ey[1] to Ey[N] in each analysis period Ta based on the N-channel observed envelopes Ex[1] to Ex[N] in each analysis period Ta. Thus, the N-channel output envelopes Ey[1] to Ey[N] are generated for each analysis period Ta. The output envelope Ey[n] of the n-th channel in one analysis period Ta is represented by a series of M levels y[n,1] to y[n,M] that correspond to M different unit periods Tu[m] within the analysis period Ta. In other words, each output envelope Ey[n] is represented by an M-dimensional vector having the M levels y[n,1] to y[n,M] as elements. The output envelopes Ey[1] to Ey[N] for the N channels generated by the signal processor 312 constitute an N-by-M non-negative matrix (hereinafter, "coefficient matrix") Y. The n-th-row and m-th-column element in the coefficient matrix Y (activation matrix) is the m-th level y[n, m] in the output envelope Ey[n].

In one analysis period Ta, the signal processor 312 generates the coefficient matrix Y from the observed matrix X by Non-negative Matrix Factorization (NMF) using a known mix matrix Q (basic matrix). The mix matrix Q is an N-by-N square matrix in which a plurality of mix proportions q[n1,n2] (n1=1 to N, n2=1 to N) are arranged. The mix matrix Q is trained in advance by machine learning and stored in the storage device 12. The mix proportions q[n,n] (n1=n2=n), which are diagonal elements of the mix matrix Q, are each set to a reference value (specifically, 1).

Each observed envelope Ex[n] is represented by the following Equation (2)

$$Ex[n] \approx q[n, 1]Ey[1] + q[n, 2]Ey[2] + \ldots + q[n, N]Ey[N]. \tag{2}$$

Thus, the N mix proportions q[n,1] to q[n,N] corresponding to the observed envelope Ex[n] are equivalent to the weighted values of the respective output envelopes Ey[n] when the observed envelope Ex[n] is approximated by the weighted sum of the N-channel output envelopes Ey[1] to Ey[N].

Thus, each mix proportion q[n1,n2] of the mix matrix Q is an index representing an extent to which the spill sound from the sound source S[n2] is mixed in the sound signal A[n1] (observed envelope Ex[n1]). In other words, the mix proportion q[n1,n2] is an index related to an arrival rate (or attenuation rate) of the spill sound arriving at the sound receiver D[n1] from the sound source S[n2]. Specifically, the mix proportion q[n1,n2] is a proportion of the volume (proportion of intensity) of the spill sound that the sound receiver D[n1] receives from another sound source S[n2] relative to the volume of the target sound that the sound receiver D[n1] receives from the sound source S[n1], when the volume of the target sound is assumed to be 1 (reference value). Accordingly, q[n1,n2]y[n2,m], which is the product of the mix proportion q[n1,n2] and the level y[n2,m] of the output envelope Ey[n2], corresponds to the volume of the spill sound arriving at the sound receiver D[n1] from the sound source S[n2].

For example, the mix proportion q[1,2] in the mix matrix Q in FIG. 5 is 0.1, which means that, in the sound signal A[1] (observed envelope Ex[1]), the spill sound from the sound source S[2] is mixed with the target sound from the sound source S[1] at a proportion with a value of 0.1 relative to the target sound. The mix proportion q[1,3] is 0.2, which means that, in the sound signal A[1](observed envelope Ex[1]), the spill sound from the sound source S[3] is mixed with the target sound from the sound source S[1] at a proportion with a value of 0.2 relative to the target sound. Likewise, for example, the mix proportion [3,1] is 0.2, which means that, in the sound signal A[3] (observed envelope Ex[3]), the spill sound from the sound source S[1] is mixed with the target sound from the sound source S[3] at a proportion with a value of 0.2 relative to the target sound. Thus, the larger the mix proportion q[n1,n2] is, the louder the spill sound arriving at the sound receiver D[n1] from the sound source S[n2] is.

The signal processor 312 of the first embodiment repeatedly updates the coefficient matrix Y so that a product QY of the mix matrix Q and the coefficient matrix Y approaches the observed matrix X. For example, the signal processor 312 calculates the coefficient matrix Y so as to minimize an evaluation function F(X|QY), which represents a distance between the observed matrix X and the product QY. The evaluation function F(X|QY) can be any distance norm, such as Euclidean distance, Kullback-Leibler (KL) divergence, Itakura-Saito distance, or P-divergence.

Focus is now given to any two sound sources S[k1] and S[k2] among N sound sources S[1] to S[N] (k1=1 to N, k2=1 to N, k1≠k2). The N-channel observed envelopes Ex[1] to Ex[N] include an observed envelope Ex[k1] and an observed envelope Ex[k2]. The observed envelope Ex[k1] is a contour of a sound signal A[k1] generated by picking up sound mainly from the sound source S[k1] in the vicinity. The observed envelope Ex[k1] is an example of a "first observed envelope," the sound source S[k1] is an example of a "first sound source," and the sound signal A[k1] is an example of a "first sound signal." The observed envelope Ex[k2] is a contour of a sound signal A[k2] generated by picking up sound mainly from the sound source S[k2] in the vicinity. The observed envelope Ex[k2] is an example of a "second observed envelope," the sound source S[k2] is an example of a "second sound source," and the sound signal A[k2] is an example of a "second sound signal.

The mix matrix Q contains a mix proportion q[k1,k2] and a mix proportion q[k2,k1]. The mix proportion q[k1,k2] represents a mix proportion of the spill sound from the sound source S[k2] in the sound signal A[k1](observed envelope Ex[k1]), and the mix proportion q[k2,k1] represents a mix proportion of the spill sound from the sound source S[k1] in the sound signal A[k2] (observed envelope Ex[k2]). The output envelopes for the N channels Ey[1] to Ey[N] include an output envelope Ey[k1] and an output envelope Ey[k2]. The output envelope Ey[k1] is an example of a "first output envelope" and represents a contour of the target sound from the sound source S[k1] in the observed envelope Ex[k1]. The output envelope Ey[k2] is an example of a "second output envelope" and represents a contour of the target sound from the sound source S[k2] in the observed envelope Ex[k2].

Figure 6:
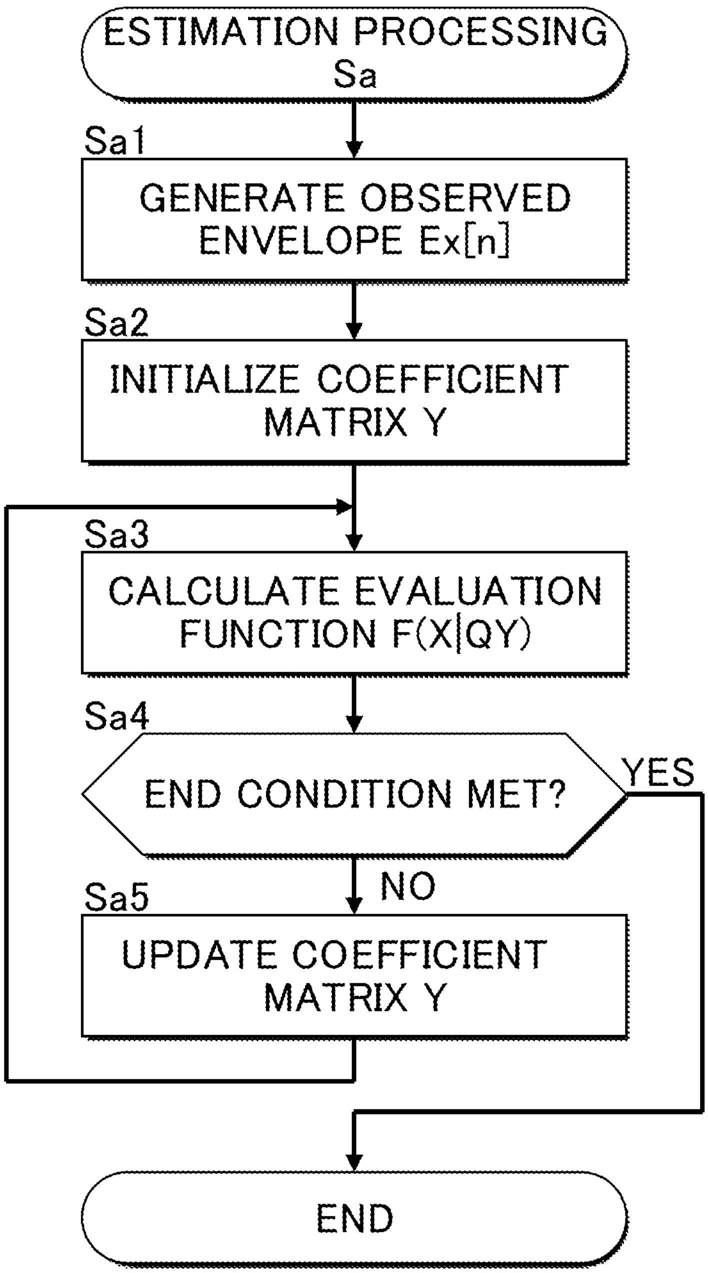
FIG. 6 is a flowchart illustrating an example procedure of the estimation processing.

FIG. 6 is a flowchart illustrating an example procedure of the processing Sa by which the controller 11 generates the coefficient matrix Y (hereinafter, "estimation processing"). The estimation processing Sa is initiated upon input of an instruction by a user to the input device 14, and is executed in conjunction with production of sound by the N sound sources S[1] to S[N]. For example, the user of the audio system 100 plays a musical instrument which is the sound source S[n]. The estimation processing Sa is executed in conjunction with playing of musical instruments by a plurality of users. The estimation processing Sa based on the Non-negative Matrix Factorization is executed for each analysis period Ta.

When the estimation processing Sa is started, the envelope obtainer 311 generates observed envelopes Ex[1] to Ex[N] (i.e., the observed matrix X) for the N channels based on N-channel sound signals A[1] to A[N] (Sa1). Specifically, the envelope obtainer 311 calculates each level x[n,m] in each observed envelope Ex[n] by calculation of the above Equation (1).

The signal processor 312 initializes the coefficient matrix Y (Sa2). For example, the signal processor 312 sets the observed matrix X in the immediately previous analysis period Ta as the initial value of the coefficient matrix Y for the current analysis period Ta. The method of initializing the coefficient matrix Y is not limited to the above example. The signal processor 312 may set the observed matrix X generated for the current analysis period Ta as the initial value of the coefficient matrix Y in the current analysis period Ta. The signal processor 312 may set a matrix obtained by adding a random number to each element of the observed matrix X or the coefficient matrix Y in the immediately previous analysis period Ta, as the initial value of the coefficient matrix Y in the current analysis period Ta.

The signal processor 312 calculates the evaluation function F(X|QY) representing a distance between the product QY of the known mix matrix Q and the current coefficient matrix Y, and the observed matrix X of the current analysis period Ta (Sa3). The signal processor 312 determines whether a predetermined end condition is met (Sa4). The end condition is, for example, that the evaluation function F(X|QY) falls below a predetermined threshold, or that the number of times the coefficient matrix Y has been updated reaches a predetermined threshold.

If the end condition is not met (Sa4: NO), the signal processor 312 updates the coefficient matrix Y so that the evaluation function F(X|QY) decreases (Sa5). The calculation of the evaluation function F(X|QY) (Sa3) and the update of the coefficient matrix Y (Sa5) are repeated until the end condition is met (Sa4: YES). The coefficient matrix Y is established with numerical values upon and in response to reaching a stage in which the end condition is met (Sa4: YES).

The generation of the N-channel observed envelopes Ex[1] to Ex[N](Sa1) and the generation of the plurality of output envelopes Ey[1] to Ey[N](Sa2 to Sa5) are performed for each analysis period Ta in conjunction with the pick-up of sound from the N sound sources S[1] to S[N].

As will be understood from the above explanation, in the first embodiment, the output envelope Ey[n] is generated by processing the observed envelope Ex[n], which represents the contour of each sound signal A[n]. Compared with a configuration of analyzing each sound signal A[n], it is possible to reduce a load for the estimation processing Sa, which estimates a series of levels of a target sound (output envelope Ey[n]) for each sound source S[n].

2. Learning Processor 32

As illustrated in FIG. 3, the controller 11 functions as the learning processor 32 by executing the learning processing program P2. The learning processor 32 generates a mix matrix Q to be used in the estimation processing Sa. The mix matrix Q is generated (or trained) at a freely-selected point in time prior to the execution of the estimation processing Sa. Specifically, an initial mix matrix Q is newly generated, and the generated mix matrix Q is trained (or retrained). The learning processor 32 comprises an envelope obtainer 321 and a signal processor 322.

The envelope obtainer 321 generates an observed envelope Ex[n] (Ex[1] to Ex[N]) for each of N-channel sound signals A[1] to A[N] prepared for training. The duration of the sound signal A[n] for training corresponds to the total duration of M unit periods Tu[1] to Tu[M] (i.e., the duration of the analysis period Ta). Thus, an N-by-M observed matrix X containing N-channel observed envelopes Ex[1] to Ex[N]

is generated. The operation carried out by the envelope obtainer 321 is the same as the operation carried out by the envelope obtainer 311.

The signal processor 322 generates a mix matrix Q and N-channel output envelopes Ey[1] to Ey[N] from the N-channel observed envelopes Ex[1] to Ex[N] in the analysis period Ta. Thus, the mix matrix Q and the coefficient matrix Y are generated from the observed matrix X. The process of updating the mix matrix Q using the N-channel observed envelopes Ex[1] to Ex[N] is one epoch, and the mix matrix Q used in the estimation processing Sa is established (trained) by repeating the epoch multiple times until the predetermined end condition is met. The end condition may be different from the end condition of the estimation processing Sa described above. The mix matrix Q generated by the signal processor 322 is stored in the storage device 12.

The signal processor 322 generates the mix matrix Q and the coefficient matrix Y from the observed matrix X by Non-negative Matrix Factorization. Thus, the signal processor 322 updates the coefficient matrix Y so that the product QY of the mix matrix Q and the coefficient matrix Y approaches the observed matrix X for each epoch. The signal processor 322 repeatedly updates the coefficient matrix Y over a plurality of epochs, to calculate the coefficient matrix Y so that the evaluation function F(X|QY), which represents the distance between the observed matrix X and the product QY, gradually decreases.

Figure 7:
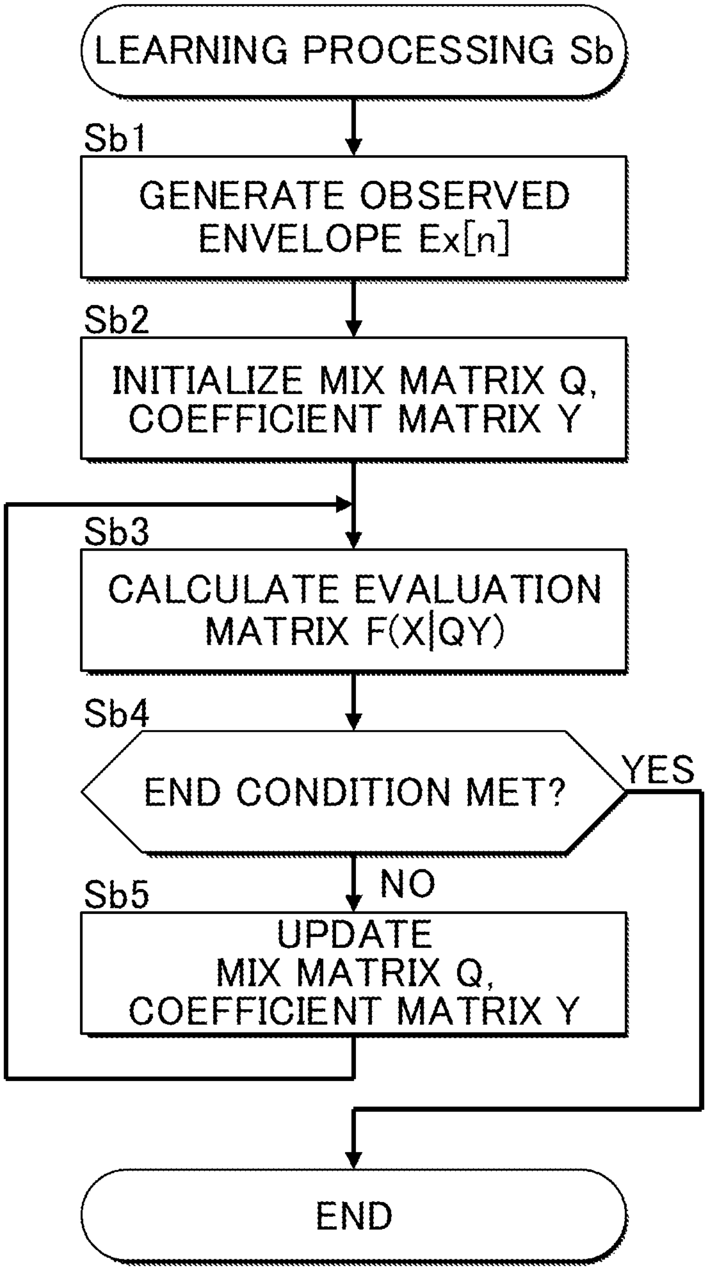
FIG. 7 is a flowchart illustrating example steps of learning processing.

FIG. 7 is a flowchart showing an example procedure of the processing Sb in which the controller 11 generates (i.e. trains) the mix matrix Q (hereinafter, "learning processing"). The learning processing Sb based on the Non-negative Matrix Factorization is initiated by an instruction provided by a user to the input device 14. For example, a performer plays a musical instrument, which is the sound source S[n], for example at a rehearsal held before start of an actual performance in which the estimation processing Sa is executed. The user of the audio system 100 acquires N-channel sound signals A[1] to A[N] for training by receiving the performance sound.

A level of spill sound arriving at the sound receiver D[n] from other sound sources S[n'] changes in response to a change in a sound receiving condition, such as a position of the sound source S[n], a position of the sound receiver D[n], or a relative positional relationship between the sound source S[n] and the sound receiver D[n]. Therefore, every time the sound receiving condition changes, the mix matrix Q is updated by executing the learning processing Sb in accordance with an instruction provided by the user.

If the user notices a change in the sound receiving condition or an error in the estimation during execution of the estimation processing Sa concurring with the performance of each musical instrument, the user can instruct the audio system 100 to retrain the mix matrix Q. In response to an instruction provided by the user, the audio system 100 records the current performance to obtain a sound signal A[n] for training while executing the estimation processing Sa using the current mix matrix Q. The learning processor 32 retrains the mix matrix Q by the learning processing Sb using the sound signal A[n] for training. The estimation processor 31 uses the retrained mix matrix Q in the estimation processing Sa carried out for subsequent performances. Thus, the mix matrix Q can be updated during a performance.

When the learning processing Sb is started, the envelope obtainer 321 generates the N-channel observed envelopes Ex[1] to Ex[N] from the N-channel sound signals A[1] to A[N] for training (Sb1). Specifically, the envelope obtainer 321 calculates each level x[n,m] in each observed envelope Ex[n] by calculation of the above Equation (1).

The signal processor 322 initializes the mix matrix Q and the coefficient matrix Y (Sb2). For example, the signal processor 322 sets the diagonal elements (q[n,n]) to 1 and sets respective elements other than the diagonal elements to random numbers. It is of note that the method of initializing the mix matrix Q is not limited to the above example. For example, the mix matrix Q generated in the past learning processing Sb may be used as the initial mix matrix Q and retrained in the current learning processing Sb. Further, the signal processor 322 sets the observed matrix X for example, as the initial value of the coefficient matrix Y. The method of initializing the coefficient matrix Y is not limited to the above examples. For example, in a case in which the same sound signal A[n] as that for the current learning processing Sb was used in the past learning processing Sb, the signal processor 322 may use the coefficient matrix Y generated in the past learning processing Sb as the initial value of the coefficient matrix Y in the current learning processing Sb. Further, the signal processor 322 may use a matrix obtained by adding a random number to each element of the observed matrix X or of the coefficient matrix Y as illustrated above, as the initial value of the coefficient matrix Y in the current analysis period Ta.

The signal processor 322 calculates the evaluation function F(X|QY), which represents the distance between (i) the product QY of the mix matrix Q and the coefficient matrix Y and (ii) the observed matrix X of the current analysis period Ta (Sb3). The signal processor 322 determines whether the predetermined end condition is met (Sb4). The end condition of the learning processing Sb is, for example, that the evaluation function F(X|QY) falls below a predetermined threshold, or that the number of times the coefficient matrix Y has been updated reaches a predetermined threshold.

If the end condition is not met (Sb4: NO), the signal processor 322 updates the mix matrix Q and the coefficient matrix Y so that the evaluation function F(X|QY) decreases (Sb5). With the update of the mix matrix Q and the coefficient matrix Y (Sb5) and the calculation of the evaluation function F(X|QY) (Sb3) comprising one epoch, the epoch is repeated until the end condition is met (Sb4: YES). The mix matrix Q is established with the numerical value upon and in response to reaching a stage in which the end condition is met (Sb4: YES).

As will be understood from the above explanation, in the first embodiment, a mix matrix Q containing the mix proportion q[n,n'] of the spill sound from other sound sources S[n'] in each sound signal A[n] (observed envelope Ex[n]) is generated in advance from the N-channel observed envelopes Ex[1] to Ex[N] for training. The mix matrix Q represents an extent to which the sound signal A[n] corresponding to each sound source S[n] contains spill sound from other sound sources S[n'] (the extent of the sound spill). The observed envelope Ex[n], which represents a contour of the sound signal A[n], is processed in this configuration. This enables a reduction in the load for the learning processing Sb in generating the mix matrix Q compared with a configuration in which the sound signal A[n] is processed.

The difference between the estimation processing Sa and the learning processing Sb is that in the estimation processing Sa the mix matrix Q is fixed, while in the learning processing Sb the mix matrix Q is updated together with the coefficient matrix Y. Thus, the estimation processing Sa and the learning processing Sb are the same with the exception of the mix matrix Q being updated or not being updated. Accordingly, the function of the learning processor 32 may be used as the estimation processor 31. Thus, the estimation processing Sa is realized by fixing the mix matrix Q in the learning processing Sb by the learning processor 32 and processing together the observed envelopes Ex[n] over M unit periods Tu[m]. In the above example, the estimation processor 31 and the learning processor 32 are described as separate elements. However, the estimation processor 31 and the learning processor 32 may be provided in the audio processing system 10 as a single element.

3. Display Controller 33

As illustrated in FIG. 3, the controller 11 functions as the display controller 33 by executing the display control program P3. The display controller 33 causes the display device 13 to display an image (hereinafter, "analysis image") Z representing a result of processing by the estimation processing Sa or the learning processing Sb. Specifically, the display controller 33 causes the display device 13 to display any of a plurality of analysis images Z (Za to Zd) in response to an instruction from the user to the input device 14, for example. The display of the analysis image Z by the display device 13 is initiated when the user provides an instruction to the input device 14, and is executed in conjunction with production of sound by the N sound sources S[1] to S[N]. Thus, the user of the audio system 100 can view the analysis image Z in real time in conjunction with production of sound by the N sound sources S[1] to S[N] (e.g., the performance of a musical instrument). Each numerical value in the analysis image Z is displayed in decibel values, for example.

3A. Analysis Image Za

Figure 8:
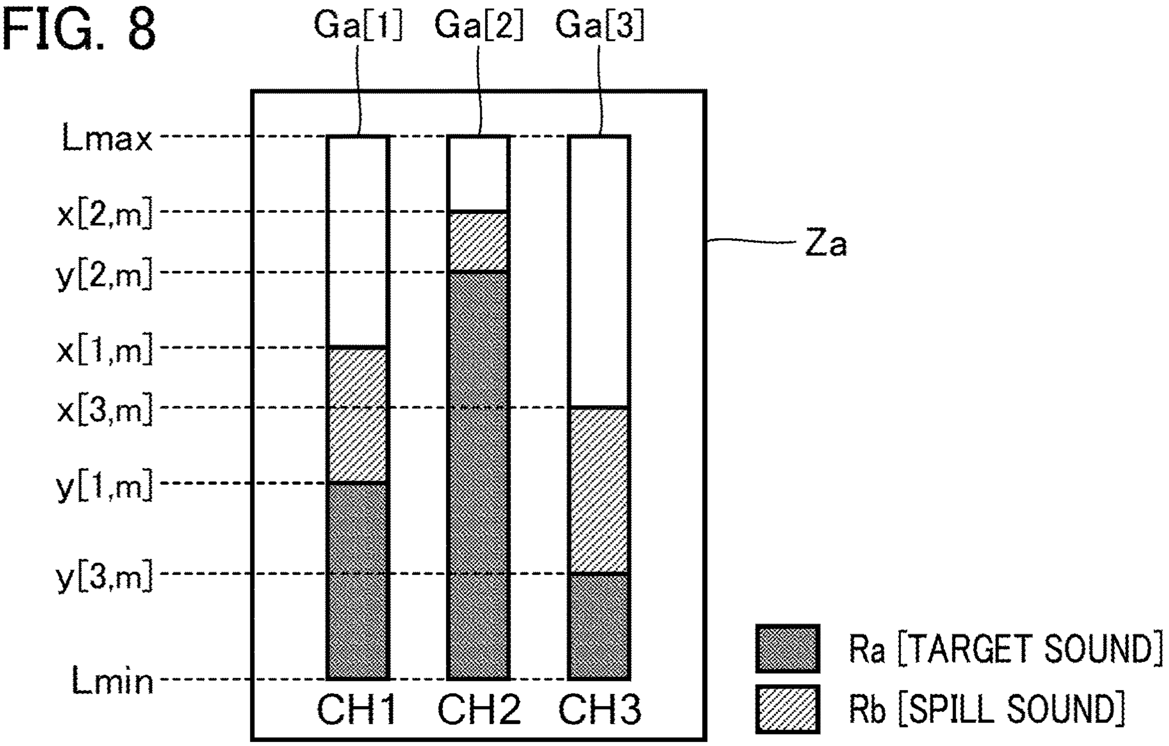
FIG. 8 is a schematic diagram of an analysis image.

FIG. 8 is a schematic diagram of an analysis image Za. The analysis image Za includes N unit images Ga[1] to Ga[N] corresponding to different channels (CH). Each unit image Ga[N] is an image representing the volume. Specifically, each unit image Ga[n] is a band-shaped image extending from the lower end representing the minimum value Lmin to the upper end representing the maximum value Lmax. The minimum value Lmin means silence (−∞ dB). The analysis image Za is an example of a "fourth image."

The unit image Ga[n], which corresponds to any one sound source S[n], is an image representing a level x[n,m] of the observed envelope Ex[n] and a level y[n,m] of the output envelope Ey[n] at one point on the time axis. Specifically, each unit image Ga[n] includes a range Ra and a range Rb. The range Ra and the range Rb are displayed with different appearances. Here, "appearance" of an image means an image property visually distinguishable by an observing person. For example, the three attributes of color: hue (color tone), saturation, and brightness (gradation), as well as size and image content (e.g., pattern or shape), are included in the concept of "appearance."

The upper end of the range Ra in the unit image Ga[n] represents the level y[n,m] of the output envelope Ey[n,m]. The upper end of the range Rb represents the level x[n,m] of the observed envelope Ex[n]. Accordingly, the range Ra represents the level of the target sound received at the sound receiver D[n] from the sound source S[n], and the range Rb represents an increased proportion of a level due to the spill sound received at the sound receiver D[n]from the other (N−1) sound sources S[n']. The levels of the target sound and the spill sound at the sound receiver D[n] vary over time, and each unit image Ga[n] changes moment by moment over time (specifically, with progress of musical performance).

As will be understood from the above explanation, by viewing the analysis image Za, the user can visually compare the level of spill sound relative to the target sound arriving at the sound receiver D[n] for each sound receiver D[n] (for each channel). For example, from the analysis image Za illustrated in FIG. 8, the user can perceive that substantially the same level of spill sound as the level of the target sound arrives at the sound receiver D[1], and a substantially lower level of spill sound than the level of the target sound arrives at the sound receiver D[2]. If the sound receiver D[n] is receiving the spill sound with large proportion, the user can adjust the position or direction of the sound receiver D[n]. After adjustment of the sound receiver D[n], the learning processing Sb described above would be executed.

3B. Analysis Image Zb

Figure 9:
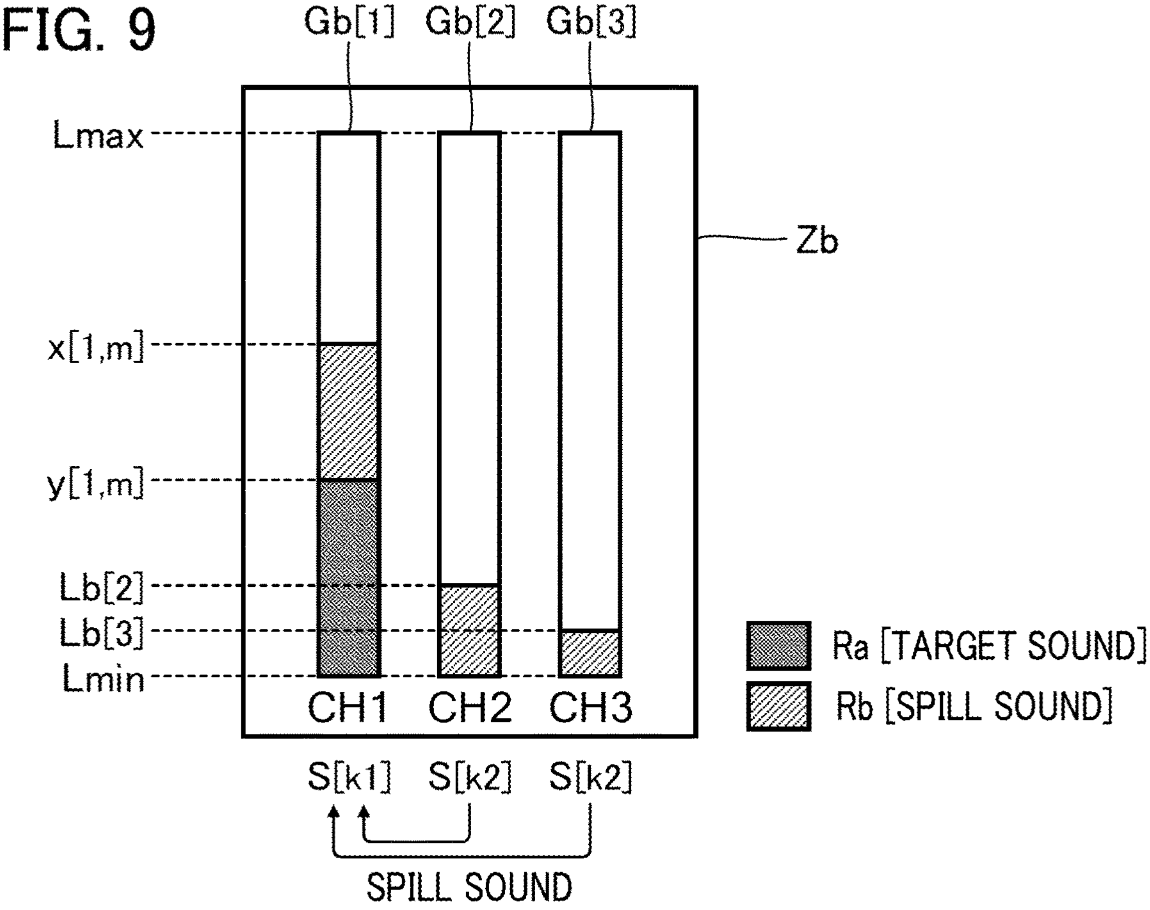
FIG. 9 is a schematic diagram of an analysis image.

FIG. 9 is a schematic diagram of an analysis image Zb. The analysis image Zb contains N unit images Gb[1] to Gb[N] corresponding to different channels (CH). Each channel corresponds to a sound source S[n]. Accordingly, the N unit images Gb[1] to Gb[N] are also referred to, in other words, as images corresponding to different sound sources S[n]. Each unit image Gb[n], similarly to the unit image Ga[n], is a band-shaped image that extends from the lower end representing the minimum value Lmin to the upper end representing the maximum value Lmax. The analysis image Zb is an example of a "first image."

The user can select any of the N sound sources S[1] to S[N] by operating the input device 14, as appropriate. The sound source S[n] selected by the user from among the N sound sources S[1] to S[N] is hereinafter referred to as a first sound source S[k1]. The (N−1) sound sources S[n] other than the first sound source S[k1] are hereinafter referred to as second sound sources S[k2]. FIG. 9 shows an example in which the sound source S[1] is selected as the first sound source S[k1], and each of the sound sources S[2] and S[3] is selected as the second sound source S[k2]. Among the N unit images Gb[1] to Gb[N], the appearance of the unit image Gb[k1] corresponding to the first sound source S[k1] is the same as that of the unit image Ga[n] in the analysis image Za. Thus, the unit image Gb[k1] represents a level x[k1,m] of an observed envelope Ex[k1] and a level y[k1,m] of an output envelope Ey[k1].

Of the N unit images Gb[1] to Gb[N], the unit image Gb[k2] corresponding to the second sound source S[k2] represents a level Lb[k2] of spill sound from the second sound source S[k2], in the observed envelope Ex[k1] of the first sound source S[k1]. The level Lb[k2] of the spill sound will be hereinafter referred to as a "spill amount." The spill amount Lb[k2] means the level of spill sound arriving at the sound receiver D[k1] from the second sound source S[k2]. Specifically, a range Rb is displayed in the unit image Gb[k2]. The upper end of the range Rb in the unit image Gb[k2] indicates the spill amount Lb[k2]. The display controller 33 multiplies the mix proportion q[k1,k2] in the mix matrix Q by the level y[k2,m] of the output envelope Ey[k2], to calculate the spill amount Lb[k2] (Lb[k2]=q[k1, k2]y[k2,m]).

For example, the spill amount Lb[2] in FIG. 9 denotes the level of spill sound from the sound source S[2] to the sound receiver D[1] (an example of a "second spill sound"), and is calculated by multiplying the mix proportion q[1,2] in the mix matrix Q by the level y[2,m] of the output envelope Ey[2] (Lb[2]=q[1,2] y[2,m]). The spill amount Lb[3] in FIG. 9 denotes the level of the spill sound from the sound source S[3] to the sound receiver D[1] (an example of a "third spill sound"), and is calculated by multiplying the mix proportion q[1,3] in the mix matrix Q by the level y[3,m] of the output envelope Ey[3] (Lb[3]=q[1,3] y[3,m]).

As will be understood from the above explanation, the sum of the spill amounts Lb[k2] of the (N−1) second sound sources S[k2] corresponds to the total level of the spill sound arriving at the sound receiver D[k1] from the (N−1) second sound sources S[k2] (i.e., the range Rb of the unit image Gb[k1]). Since the level of the spill sound to the sound receiver D[k1] varies over time, the unit image Gb[k1] and each unit image Gb[k2] change moment by moment over time (specifically, with progress of performance).

As will be understood from the above explanation, by viewing the analysis image Zb, the user can visually perceive an extent of influence of the spill sound from the respective second sound sources S[k2] on the sound signal A[k1] generated by picking up the target sound from the first sound source S[k1]. For example, from the analysis image Zb illustrated in FIG. 9, it can be understood that the level of the spill sound arriving at the sound receiver D[1] from the sound source S[2] exceeds the level of the spill sound arriving at the sound receiver D[1] from the sound source S[3]. In response to the level of the spill sound from the second sound source S[k2] being large, the user can adjust the position or direction of each sound receiver D[n] so that the spill sound from the second sound source S[k2] is reduced. After adjustment of the sound receivers D[n], the above learning processing Sb is executed.

3C. Analysis Image Zc

Figure 10:
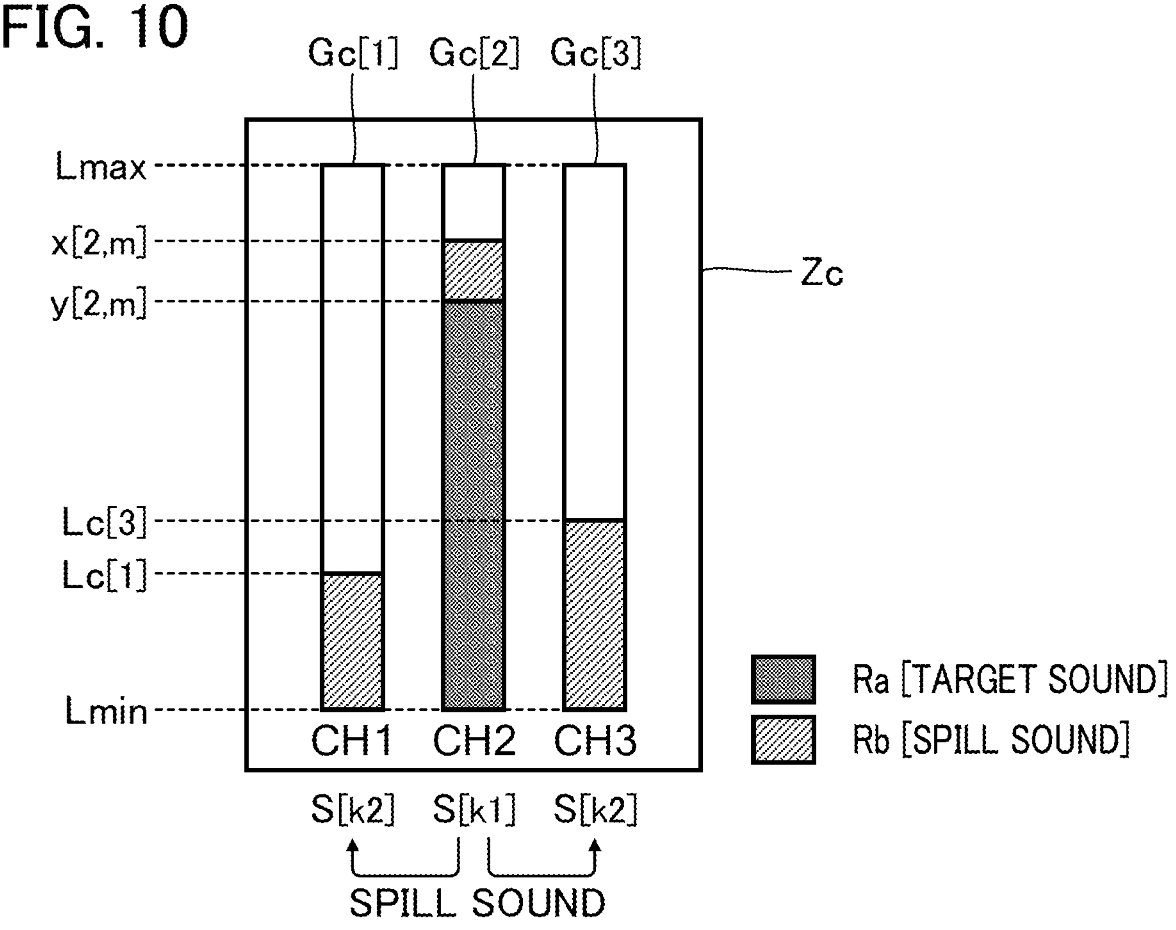
FIG. 10 is a schematic diagram of an analysis image.

FIG. 10 is a schematic diagram of an analysis image Zc. The analysis image Zc includes N unit images Gc[1] to Gc[N] corresponding to different channels (CHs). The N unit images Gc[1] to Gc[N] are also referred to as images corresponding to the different sound sources S[n]. Each unit image Gc[n], like the unit image Ga[n], is a band-shaped image extending from the lower end representing the minimum value Lmin to the upper end representing the maximum value Lmax. The analysis image Zc is an example of the "second image."

The user can select any of the N sound sources S[1] to S[N] as the first sound source S[k1] by operating the input device 14 as appropriate. The (N−1) sound sources S[n] other than the first sound source S[k1] among the N sound sources S[1] to S[N] are the second sound sources S[k2]. In FIG. 10, the sound source S[2] is selected as the first sound source S[k1], and the sound sources S[1] and S[3] are each selected as the second sound source S[k2]. Among the N unit images Gc[1] to Gc[N], the appearance of the unit image Gc[k1] corresponding to the first sound source S[k1] is the same as that of the unit image Ga[n] in the analysis image Za. Thus, the unit image Gc[k1] represents the level x[k1,m] of the observed envelope Ex[k1] and the level y[k1,m] of the output envelope Ey[k1].

Of the N unit images Gc[1] to Gc[N], the unit image Gc[k2] corresponding to the second sound source S[k2] represents a spill amount Lc[k1] from the first sound source S[k1] in the observed envelope Ex[k2] for the second sound source S[k2] (an example of a "second observed envelope" and a "third observed envelope"). The spill amount Lc[k2] denotes the level of the spill sound arriving at each sound receiver D[k2] from the first sound source S[k1]. Specifically, a range Rb is displayed in the unit image Gc[k2]. The upper end of the range Rb in the unit image Gc[k2] indicates the amount of the spill sound Lc[k2]. The display controller 33 calculates the spill amount Lc[k2] (Lc[k2]=q[k2,k1]y[k1,m]) by multiplying the mix proportion q[k2,k1] in the mix matrix Q by the level y[k1,m] of the output envelope Ey[k1].

For example, the spill amount Lc[1] in FIG. 10 denotes the level of the spill sound received at the sound receiver D[1] from the sound source S[2], and is calculated by multiplying the mix proportion q[1,2] in the mix matrix Q by the level y[2,m] of the output envelope Ey[2] (Lc[1]=q[1,2]y[2,m]). The spill amount Lc[3] in FIG. 10 denotes the level of the spill sound received at the sound receiver D[3] from the sound source S[2], and is calculated by multiplying the mix proportion q[3,2] in the mix matrix Q by the level y[2,m] of the output envelope Ey[2] (Lc[3]=q[3,2]y[2,m]).

Since the level of the spill sound arriving at the sound receiver D[k1] varies over time, the unit image Gc[k1] and each unit image Gc[k2] will change moment by moment over time (specifically, progress of performance).

As will be understood from the above explanation, by viewing the analysis image Zc, the user can visually perceive an extent of influence of the spill sound from the first sound source S[k1] to the sound signals A[k2] generated by picking up target sound from the second sound source S[k2]. For example, from the analysis image Zc illustrated in FIG. 10, the user can visually perceive that the level of the spill sound arriving at the sound receiver D[1] from the sound source S[2] is lower than the level of the spill sound arriving at the sound receiver D[3] from the sound source S[2].

3D. Analysis Image Zd

Figure 11:
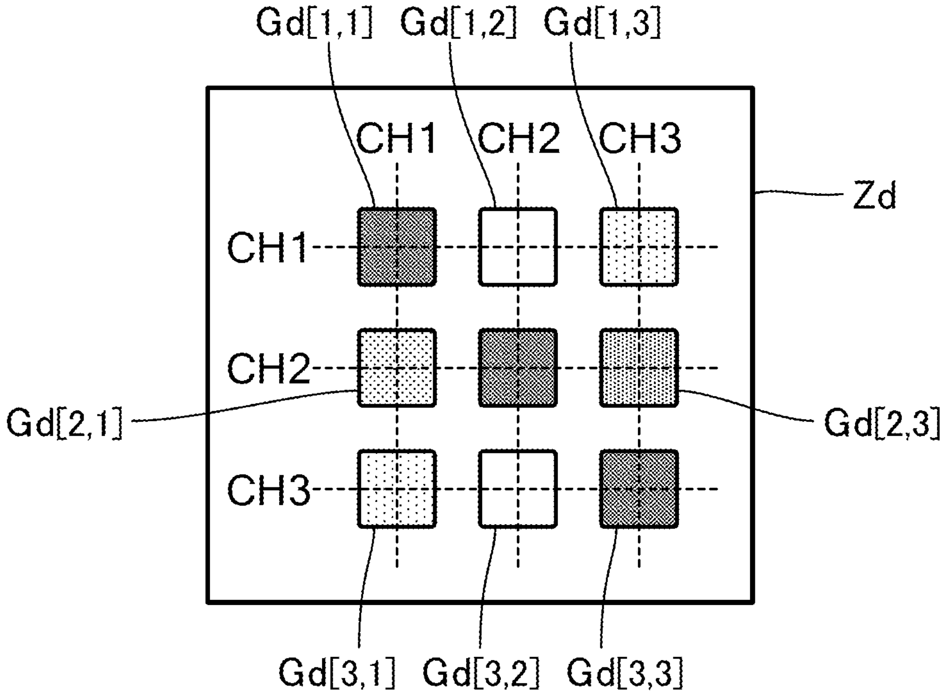
FIG. 11 is a schematic diagram of an analysis image.

FIG. 11 is a schematic diagram of an analysis image Zd. The analysis image Zd is an image representing the mix matrix Q. Specifically, the analysis image Zd contains $N^2$ unit images Gd[1,1] to Gd[N,N], which are arranged in an N-by-M matrix, just like the mix matrix Q.

Any one unit image Gd[n1,n2] in the analysis image Zd represents a mix proportion q[n1,n2] located at the n1-th row and n2-th column in the mix matrix Q. Specifically, the unit image Gd[n1,n2] is displayed in an appearance (e.g., hue or brightness) in accordance with the mix proportion q[n1,n2]. For example, the larger the mix proportion q[n1,n2] is, the unit image Gd[n1,n2] is displayed in the hue closer to the longer wavelength. Alternatively, the larger the mix proportion q[n1,n2] is, the unit image Gd[n1,n2] is displayed with the higher brightness (lighter gradation). In other words, the analysis image Zd is an image in which, for each of the N sound sources S[1] to S[N], mix proportions q[n,n'] between the target sound from the sound source S[n] and the spill sound from the other sound sources S[n'], are arranged. The analysis image Zd is an example of a "third image."

As will be understood from the above explanation, the user can visually understand, for any two sound sources (S[n], S[n']) out of N sound sources S[1] to S[N], an extent to which the sound source S[n] affects the sound source S[n'].

4. Audio Processor 34

As illustrated in FIG. 3, the controller 11 functions as the audio processor 34 by executing the audio processing program P4. The audio processor 34 generates the sound signals B[n](B[1] to B[N]) by performing audio processing for each of the N-channel sound signals A[1] to A[N]. Specifically, the audio processor 34 performs audio processing on the sound signal A[n] in accordance with the level y[n,m] of the output envelope Ey[n] generated by the estimation processor 31. As described above, the output envelope Ey[n] is an envelope that represents the contour of the target sound from the sound source S[n] in the sound signal A[n]. Specifically, the audio processor 34 executes audio processing for each of a plurality of processing periods H set in the sound signal A[n] based on the level y[n,m] of the output envelope Ey[n].

For example, focus will now be on any two sound sources S[k1] and S[k2] among the N sound sources S[1] to S[N]. The audio processor 34 executes audio processing of the sound signal A[k1] based on the level y[k1,m] of the output envelope Ey[k1], and performs audio processing of the sound signal A[k2] based on the level y[k2,m] of the output envelope Ey[k2].

The audio processor 34 generates a sound signal B from the N-channel sound signals B[1] to B[N]. Specifically, the audio processor 34 generates the sound signal B by multiplying each of the N-channel sound signals B[1] to B[N] by a coefficient and then mixing the N channels. The coefficients (i.e., weighting values) of the respective sound signals B[n] are set, for example, in accordance with an instruction provided by the user to the input device 14.

The audio processor 34 performs audio processing including dynamic control of the volume of the sound signal A[n]. The dynamic control includes effector processing, such as gate processing and compression processing. The user can select the type of audio processing by operating the input device 14, as appropriate. The type of audio processing may be selected individually for each of the N-channel sound signals A[1] to A[N], or collectively for the N-channel sound signals A[1] to A[N].

4A. Gate Processing

Figure 12:
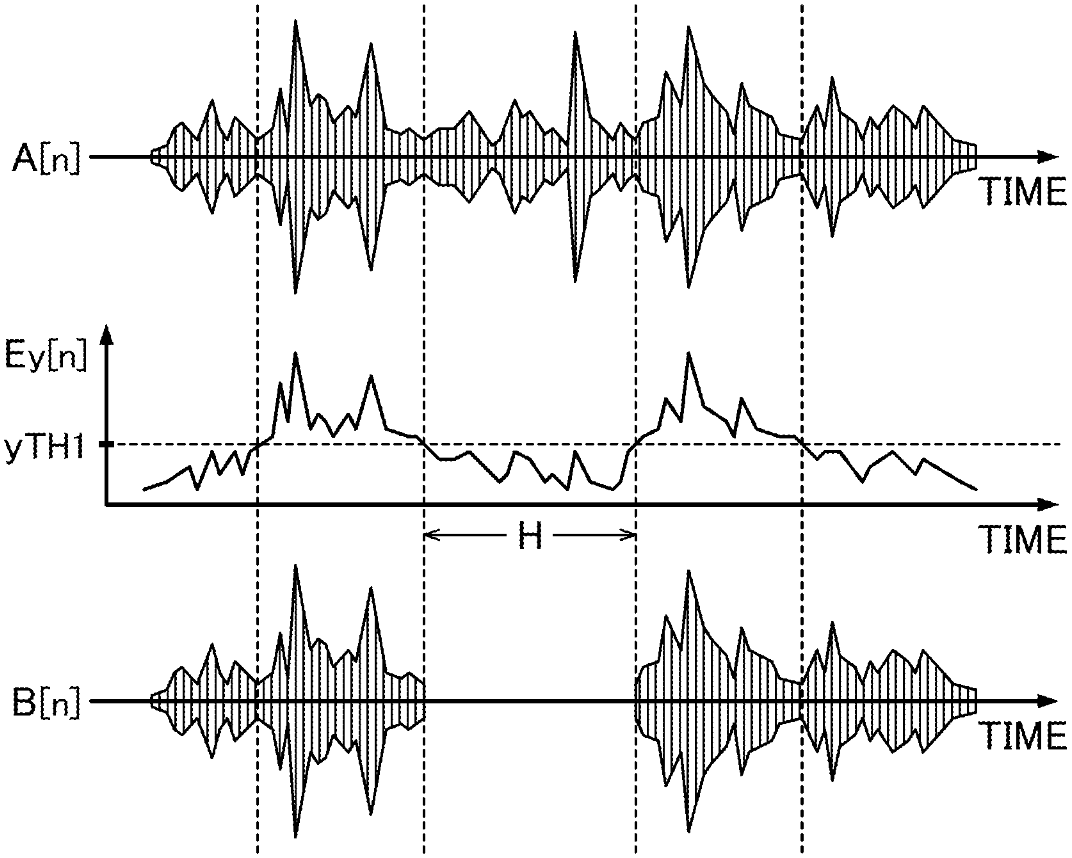
FIG. 12 is a schematic diagram of gate processing carried out by an audio processor.

FIG. 12 illustrates gate processing of the audio processing. In response to selection by the user of the gate processing, the audio processor 34 sets as a processing period H a period with a variable duration in which the level y[n,m] of the output envelope Ey[n] is below a predetermined threshold yTH1. The threshold yTH1 is, for example, a variable value set in response to an instruction provided by the user to the input device 14. Alternatively, the threshold yTH1 may be fixed at a predetermined value.

The audio processor 34 reduces the volume of each processing period H in the sound signal A[n]. Specifically, the audio processor 34 sets the level of the sound signal A[n] in the processing period H to zero (i.e., mutes the sound). According to the gate processing illustrated above, the spill sound from other sound sources S[n'] in the sound signal A[n] can be effectively reduced.

4B. Compression Processing

Figure 13:
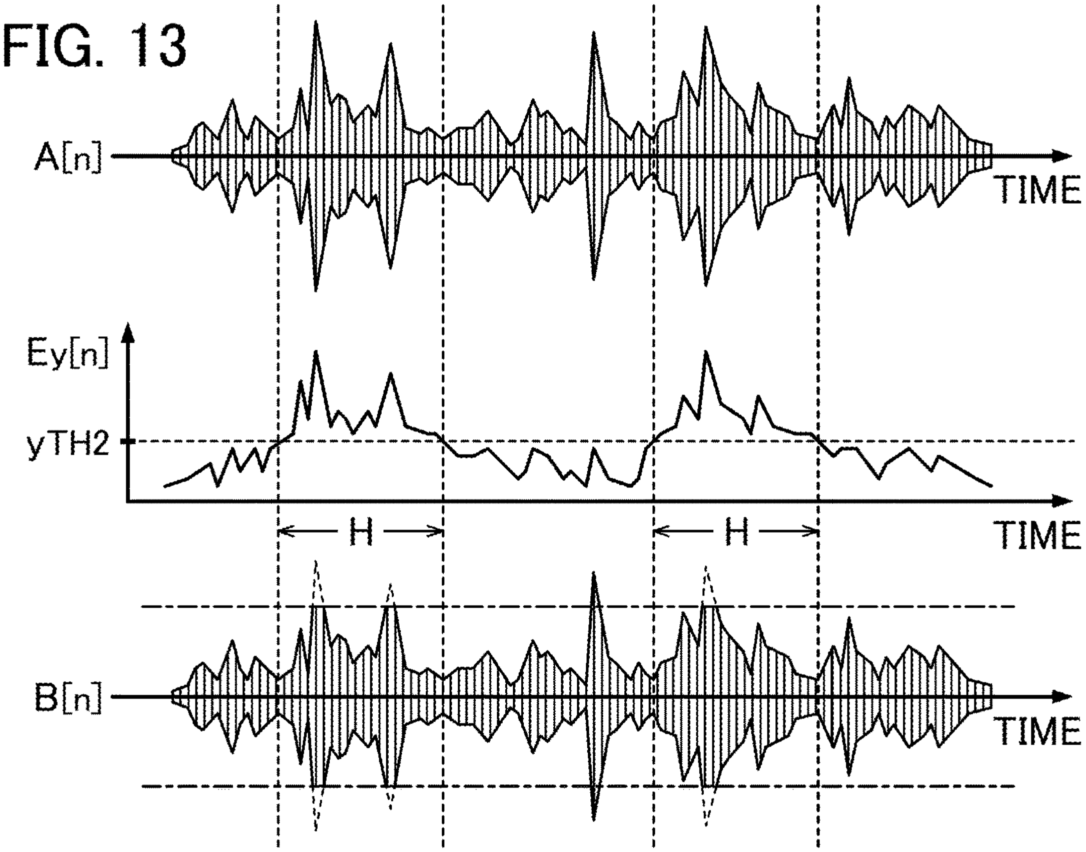
FIG. 13 is a schematic diagram of compression processing carried out by the audio processor.

FIG. 13 is an explanatory diagram of compression processing carried out by the audio processor. In response to selection by the user of the compression processing, the audio processor 34 reduces the gain of the sound signal A[n] of the n-th channel in a processing period H in which the level y[n,m] of the output envelope Ey[n] of the n-th channel exceeds a predetermined threshold yTH2. The threshold yTH2 is, for example, a variable value set in accordance with an instruction from the user to the input device 14. However, the threshold yTH2 may be fixed at a predetermined value.

The audio processor 34 reduces the volume of each processing period H in the sounds signal A[n]. Specifically, the audio processor 34 reduces the signal value by reducing the gain for each processing period H of the sound signal A[n]. The extent (ratio) to which the gain is reduced of the sound signal A[n] is set, for example, in accordance with an instruction provided by the user to the input device 14. As described above, the output envelope Ey[n] is a signal that represents the contour of the target sound from the sound source S[n]. Therefore, by reducing the volume of the sound signal A[n] for the processing period H in which the level y[n,m] of the output envelope Ey[n] exceeds the threshold yTH2, it is possible to effectively control changes in volume of the target sound of the sound signal A[n].

Figure 14:
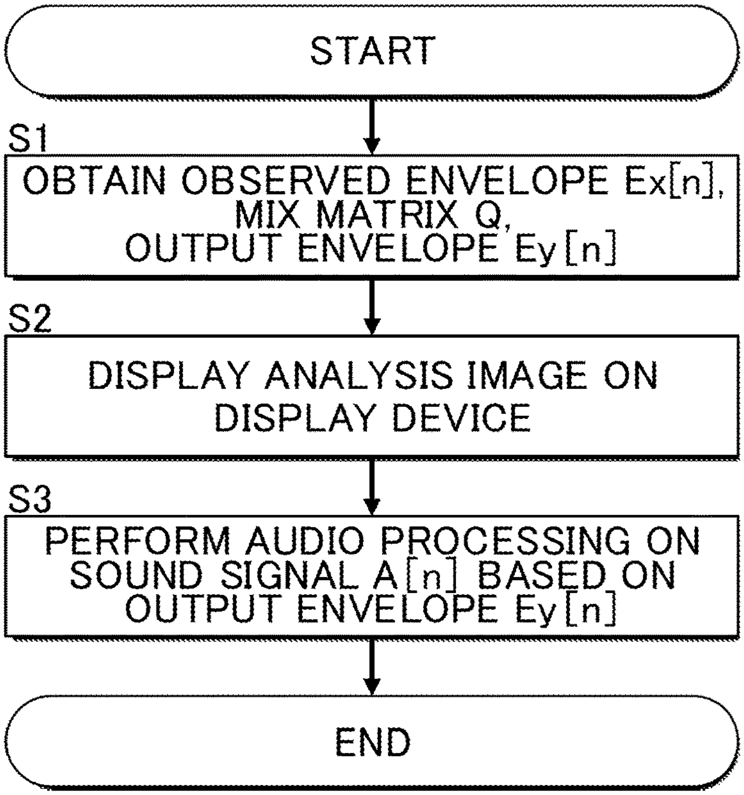
FIG. 14 is a flowchart illustrating an overall operation procedure of an audio processing system.

FIG. 14 is a flowchart showing overall an operation performed by the controller 11 of the audio processing system 10. For example, in conjunction with the production of sound by the N sound sources S[1] to S[N], the processing shown in FIG. 14 is executed for each analysis period Ta.

The controller 11 (estimation processor 31) executes the above-described estimation processing Sa to generate the N-channel output envelopes Ey[1] to Ey[N] from the N-channel observed envelopes Ex[1] to Ex[N] and the mix matrix Q (S1). Specifically, the controller 11 first generates the observed envelopes Ex[1] to Ex[N] from the N-channel sound signals A[1] to A[N]. Secondly, the controller 11 generates the N-channel output envelopes Ey[1] to Ey[N] by the estimation processing Sa shown in FIG. 6.

The controller 11 (display controller 33) displays the analysis image Z on the display device 13 (S2). For example, the controller 11 displays the analysis image Za based on the N-channel observed envelopes Ex[1] to Ex[N] and the N-channel output envelopes Ey[1] to Ey[N] on the display device 13. Also, the controller 11 displays the analysis image Zb or Zc based on the mix matrix Q and the N-channel output envelopes Ey[1] to Ey[N] on the display device 13. The controller 11 displays the analysis image Zd based on the mix matrix Q on the display device 13. The analysis image Z is sequentially updated for each analysis period Ta.

The controller 11 (audio processor 34) performs audio processing for each of the N-channel sound signals A[1] to A[N] based on the level y[n,m] of the output envelope Ey[n] (S3). Specifically, the controller 11 executes the audio processing for each processing period H set for the sound signal A[n] based on the level y[n,m] of the output envelope Ey[n].

As described above, in the first embodiment, audio processing is performed on the sound signal A[n] based on the level y[n,m] of the output envelope Ey[n], which represents the contour of the target sound from the sound source S[n] in the observed envelope Ex[n]. Therefore, it is possible to perform appropriate audio processing on the sound signal A[n] with the influence of the spill sound in the sound signal A[n] being reduced.

B: Second Embodiment

Description will now be given of a second embodiment. In the following examples, elements whose functions are the same as those in the first embodiment, like reference signs are used and detailed description thereof is omitted, as appropriate.

In the first embodiment, the estimation processing Sa is executed for each analysis period Ta including a plurality of unit periods Tu[m] (Tu[1] to Tu[M]). In the second embodiment, the estimation processing Sa is executed for each unit period Tu[m]. Thus, in the second embodiment the number M of the unit periods Tu[m] included in one analysis period Ta in the first embodiment is limited to 1.

Figure 15:
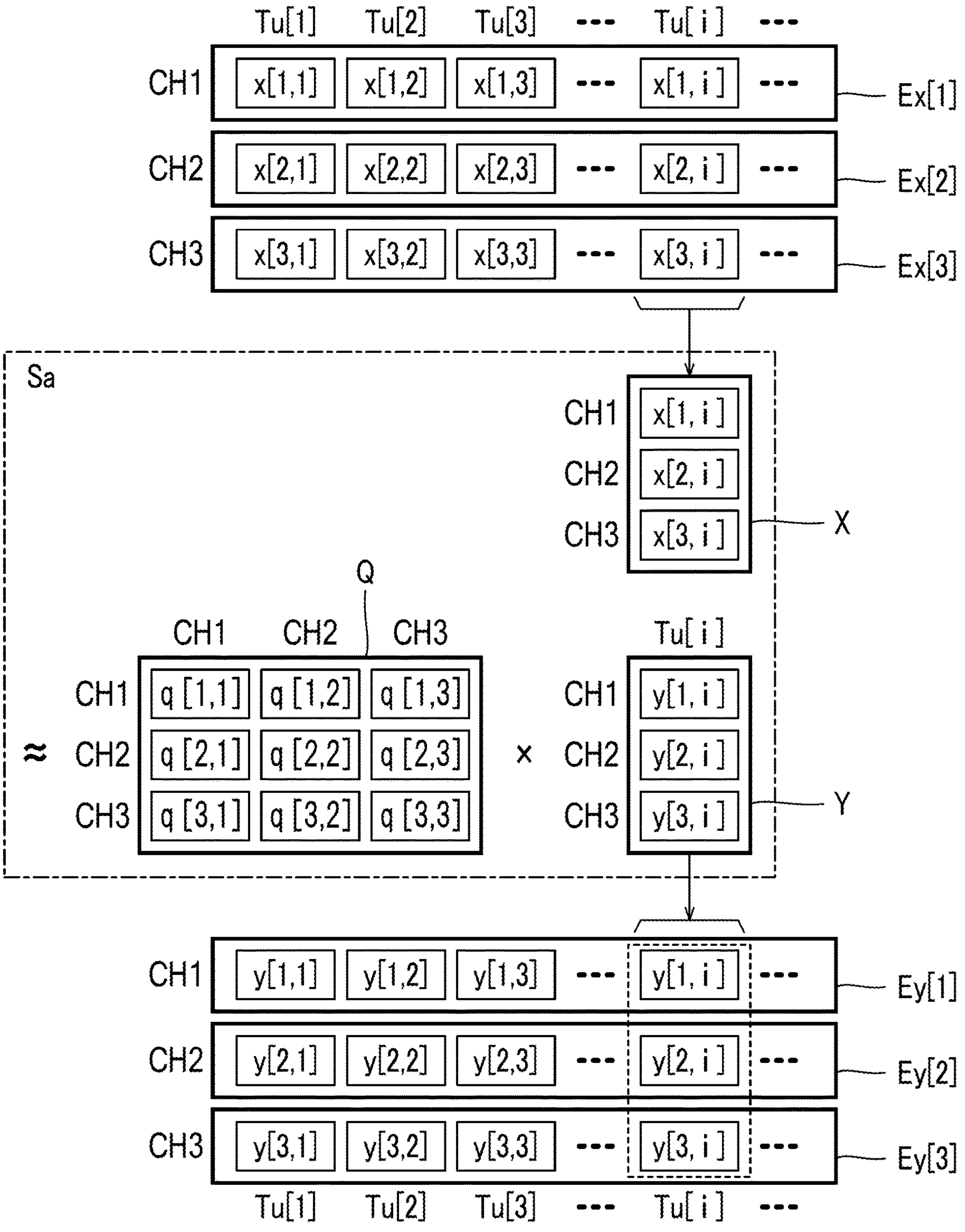
FIG. 15 is an explanatory diagram of estimation processing in a second embodiment.

FIG. 15 is an explanatory diagram of the estimation processing Sa in the second embodiment. In the second embodiment, N-channel levels x[1,i] to x[N,i] are generated for each unit period Tu[i] (i is a natural number) on the time axis. An observed matrix X is a non-negative N-by-one matrix in which the levels x[1,i] to x[N,i] corresponding to one unit period Tu[i] are vertically arranged for the N channels. Therefore, the series of the observed matrices X over a plurality of unit periods Tu[i] corresponds to the N-channel observed envelopes Ex[1] to Ex[N]. Thus, the n-th channel observed envelope Ex[n] is expressed by a series of levels x[n,i] for a plurality of unit periods Tu[i]. Similarly, the coefficient matrix Y is an N-by-one non-negative matrix in which the levels y[1,i] to y[N,i] corresponding to one unit period Tu[i] are vertically arranged for the N channels. Therefore, the series of the coefficient matrices Y for a plurality of unit periods Tu[i] corresponds to the N-channel output envelopes Ey[1] to Ey[N]. The mix matrix Q is an N-by-N square matrix with a plurality of mix proportions q[n1,n2] arranged in the same way as in the first embodiment.

In the first embodiment, the estimation processing Sa shown in FIG. 6 is performed for each analysis period Ta, which includes M unit periods Tu[1] to Tu[M]. In the second embodiment, the estimation processing Sa is executed for each unit period Tu[i]. Thus, the estimation processing Sa is executed in real time in conjunction with the production of sound by the N sound sources S[1] to S[N]. The details of the estimation processing Sa are the same as those in the first embodiment. The learning processing Sb is performed for one analysis period Ta, which includes M unit periods Tu[1] to Tu[m], as in the first embodiment. Thus, in the second embodiment, the estimation processing Sa is a real-time process to calculate the level y[n,i] for each unit period Tu[i], while the learning processing Sb is a non-real-time process that calculates the output envelope Ey[n] for the plurality of unit periods Tu[1] to Tu[M].

As will be understood from the above explanation, according to the second embodiment, the delay of the output envelope Ey[n] relative to the production of sound by the N sound sources S[1] to S[N] is reduced. Accordingly, it is possible to generate each output envelope Ey[n] in real time in conjunction with the sound production by the N sound sources S[1] to S[N].

The processes (S1 to S3) illustrated in FIG. 14 are executed for each unit period Tu[i]. Therefore, for each unit period Tu[i], the controller 11 (display controller 33) updates the analysis images Z (Za, Zb, Zc, Zd) displayed on the display device 13 (S2). Thus, the analysis image Z is updated in real time in conjunction with the sound production by the N sound sources S[1] to S[N]. As will be understood from the above explanation, according to the second embodiment, the analysis image Z is updated without delay relative to the sound production by the N sound sources S[1] to S[N]. Therefore, the user is able to view the changes in the spill sound in each channel in real time. In the analysis image Za, the level x[n,i] of the observed envelope Ex[n] and the level y[n,i] of the output envelope Ey[n] in one unit period Tu[i] are displayed on the display device 13 for each channel, and the analysis image Za is updated sequentially for each unit period Tu[i].

The controller 11 (audio processor 34) performs audio processing of the sound signal A[n] every unit period Tu[i] (S3). Therefore, each sound signal A[n] can be processed without delay relative to the sound production by the N sound sources S[1] to S[N].

C: Third Embodiment

Figure 16:
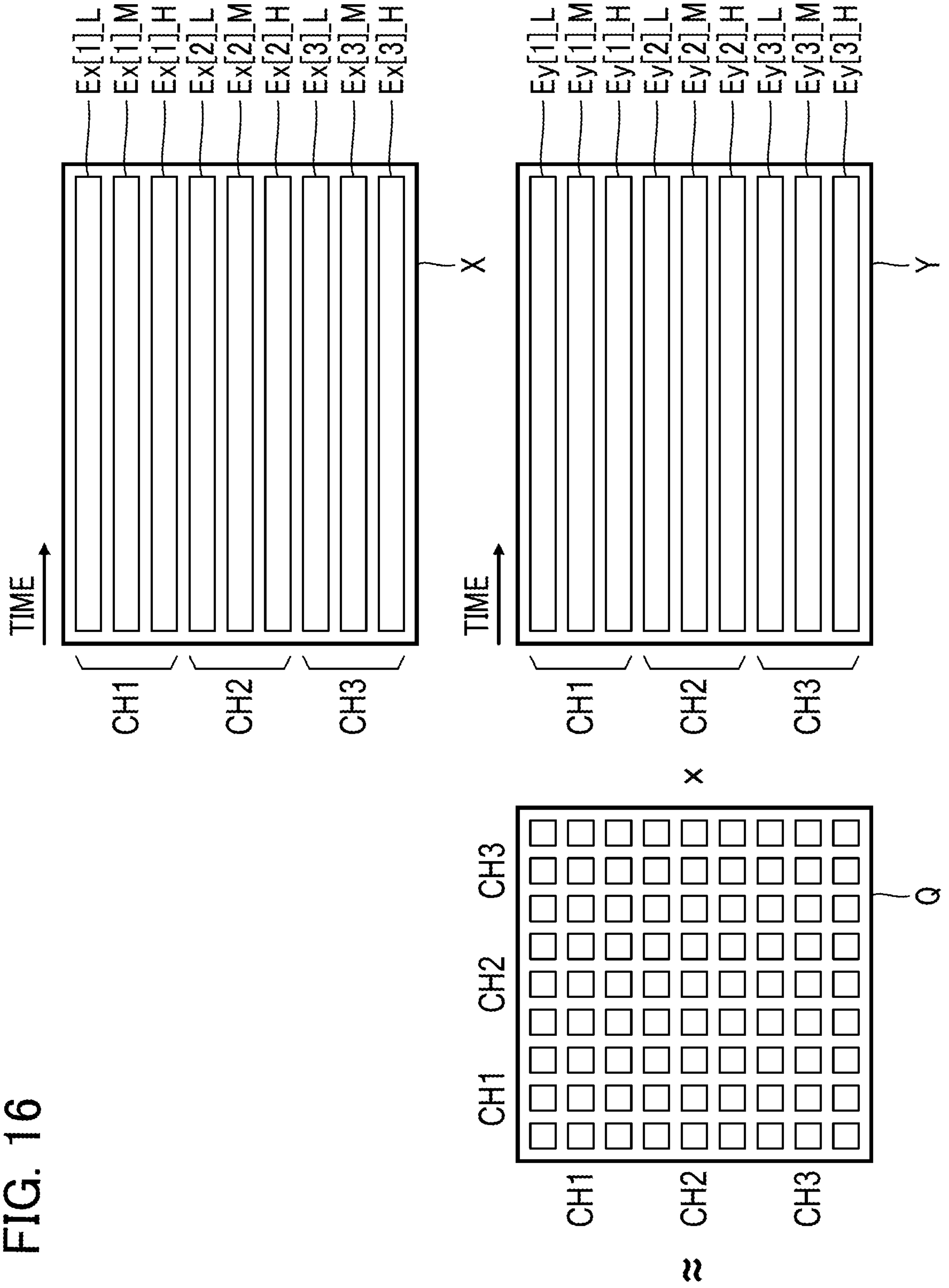
FIG. 16 is an explanatory diagram of estimation processing in a third embodiment.

FIG. 16 is an explanatory diagram of estimation processing Sa in the third embodiment. The envelope obtainer 311 in the estimation processor 31 of the first embodiment generates the N-channel observed envelopes Ex[1] to Ex[N] corresponding to the different sound sources S[n]. The envelope obtainer 311 of the third embodiment generates three observed envelopes Ex[n] corresponding to different frequency bands (Ex[n]_L, Ex[n]_M, and Ex[n]_H) for each channel. The observed envelope Ex[n]_L corresponds to a low frequency band, the observed envelope Ex[n]_M corresponds to a medium frequency band, and the observed envelope Ex[n]_H corresponds to a high frequency band. The low frequency band is lower than the medium frequency band, and the high frequency band is higher than the medium frequency band. Specifically, the low frequency band is a frequency band below the lower end of the medium frequency band, and the high frequency band is a frequency band above the upper end of the medium frequency band. The total number of frequency bands for which the observed envelope Ex[n] is calculated is not limited to three, and may be freely selected. The low frequency band, the medium frequency band, and the high frequency band may partially overlap each other.

The envelope obtainer 311 sections each sound signal A[n] into three frequency bands: a low frequency band, a medium frequency band, and a high frequency band. The observed envelopes Ex[n] (Ex[n]_L, Ex[n]_M, Ex[n]_H) are generated for each frequency band in the same way as in the first embodiment. As will be understood from the above explanation, the observed matrix X is a 3N-by-M non-negative matrix in which the three observed envelopes Ex[n] (Ex[n]_L, Ex[n]_M, Ex[n_H) are arranged for N channels. The mix matrix Q is a 3N-by-3N square matrix with three elements corresponding to different frequency bands arranged for N channels.

For each of the N channels, the signal processor 312 generates three output envelopes Ey[n] (Ey[n]_L, Ey[n]_M, Ey[n]_H) corresponding to different frequency bands. The output envelope Ey[n]_L corresponds to the low frequency band, the output envelope Ey[n]_M corresponds to the medium frequency band, and the output envelope Ey[n]_H corresponds to the high frequency band. Thus, the coefficient matrix Y is a 3N-by-M non-negative matrix, in which the three output envelopes Ey[n](Ey[n]_L, Ey[n]_M, and Ey[n]_H) are arranged for the N channels. The signal processor 312 generates the coefficient matrix Y from the observed matrix X by Non-negative Matrix Factorization using a known mix matrix Q.

In the above explanation, the focus was on the estimation processing Sa, but the same principle applies to the learning processing Sb. Specifically, the envelope obtainer 321 of the learning processor 32 generates three observed envelopes corresponding to different frequency bands Ex[n] (Ex[n]_L, Ex[n]_M, Ex[n]_H) from the sound signals A[n] of each of the N channels. Thus, the envelope obtainer 321 generates an 3N-by-N observed matrix X in which the three observed envelopes Ex[n] (Ex[n]_L, Ex[n]_M, Ex[n]_H) are arranged for the N channels. The mix matrix Q is a 9-by-9 square matrix with 3 elements corresponding to different frequency bands arranged over N channels. The coefficient matrix Y is a 3N-by-N non-negative matrix in which three output envelopes Ey[n] (Ey[n]_L, Ey[n]_M, Ey[n]_H) corresponding to different frequency bands are arranged for the N channels. The signal processor 322 generates the mix matrix Q and the coefficient matrix Y from the observed matrix X by Non-negative Matrix Factorization.

In the third embodiment, the same effect as that set out in the first embodiment is realized. In the third embodiment, since the observed envelope Ex[n] and the output envelope Ey[n] of each channel are separated into a plurality of frequency bands, it is possible to generate the observed envelope Ex[n] and the output envelope Ey[n] that reflect highly accurately reflect the target sound of the sound source S[n]. In FIG. 16, a configuration based on the first embodiment is shown, but the configuration of the third embodiment is equally applicable to the second embodiment, in which the estimation processing Sa is executed for each unit period Tu[i].

D: Modifications

Following are examples of specific variations additional to each of the above examples. Two or more modes freely selected from the following examples may be combined as appropriate so long as they do not contradict each other.

(1) In each of the above-described embodiments, the observed envelope Ex[n] of each sound signal A[n] is generated by calculation of the above Equation (1). However, the method by which the envelope obtainer 311 or the envelope obtainer 321 generates the observed envelope Ex[n] is not limited to the above examples. For example, the observed envelope Ex[n] may comprise a curve or a straight line that reduces over time from each peak on the positive side of the sound signal A[n]. Also, the observed envelope Ex[N] may be generated by smoothing the positive components of the sound signal A[n].

(2) In the above-described embodiments, the envelope obtainer 311 and the envelope obtainer 321 of the audio processing system 10 generate the observed envelope Ex[n] from each sound signal A[n]. However, the observed envelope Ex[n] generated in an external device may be received by the envelope obtainer 311 or the envelope obtainer 321. Thus, the envelope obtainer 311 or the envelope obtainer 321 includes both an element that generates the observed envelope Ex[n] by processing the sound signal A[n] and an element that receives the observed envelope Ex[n] generated by the external device.

(3) Although the above-described embodiments illustrate Non-negative Matrix Factorization, the method for generating the N-channel output envelopes Ey[1] to Ey[N] from the N-channel observed envelopes Ex[1] to Ex[N] is not limited to the above examples. For example, the Non-Negative Least Squares (NNLS) method can be used to generate each output envelope Ey[n]. Thus, any optimization method that approximates the observed matrix X by the mix matrix Q and the coefficient matrix Y can be used.

Figure 17:
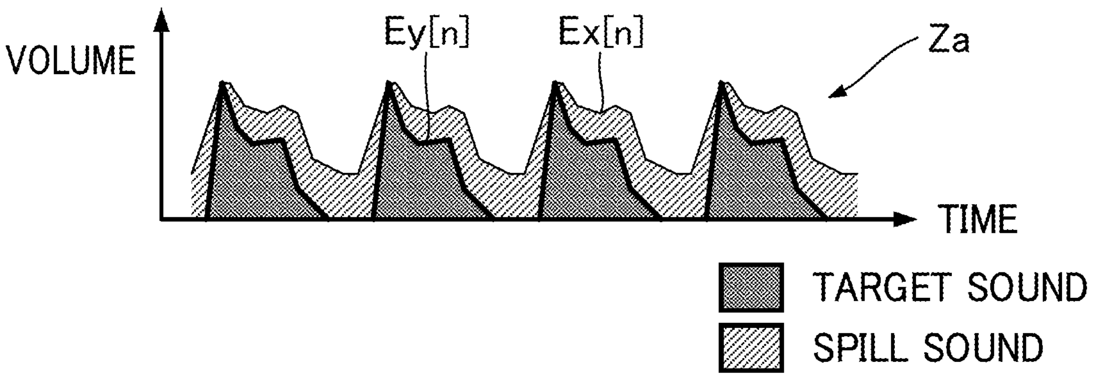
FIG. 17 is a schematic diagram of the analysis image in a modification.

(4) In the above-described embodiments, an example is given of an analysis image Za representing the level x[n,m] of the observed envelope Ex[n] and the level y[n,m] of the output envelope Ey[n] at a single point on the time axis. However, the content of the analysis image Za is not limited to the above examples. For example, as illustrated in FIG. 17, the display controller 33 may cause the display device 13 to display the analysis image Za in which the observed envelope Ex[n] and the output envelope Ey[n] are arranged under a common time axis. The difference between the observed envelope Ex[n] and the output envelope Ey[n] corresponds to the volume of the spill sound arriving at the sound receiver D[n] from a sound source S[n'] other than the sound source S[n]. As will be understood from the above example, the analysis image Za (the fourth image) is generally expressed as an image representing the level x[n,m] of the observed envelope Ex[n] of the sound source S[n] and the level y[n,m] of the output envelope Ey[n] of the sound source S[n].

(5) In the above-described embodiments, the audio processor 34 performs gate processing or compression processing of the sound signal A[n]. However, the content of the audio processing performed by the audio processor 34 is not limited to the above examples. Further to the gate processing or the compression processing, for example, dynamic control, such as limiter processing, expander processing, or maximizer processing, may be performed by the audio processor 34. Limiter processing is, for example, processing used to set a volume that exceeds a predetermined value to a predetermined value, for each processing period H in which the level y[n,m] of the output envelope Ey[n] exceeds a threshold in the sound signal A[n]. Expander processing is processing used to decrease a volume of the sound signal A[n] in each processing period H. Maximizer processing is processing used to increase a volume of the sound signal A[n] in each processing period H. Audio processing is not limited to dynamic control of the volume of the sound signal A[n]. For example, the audio processor 34 can be used to perform various types of audio processing, such as distortion processing to generate waveform distortion in each processing period H of the sound signal A[n], or reverb processing to add reverberation to the sound signal A[n] in each processing period H, etc.

(6) The audio processing system 10 may be realized by a server apparatus that communicates with a terminal apparatus, such as a cell phone or a smart phone. For example, the audio processing system 10 generates the N-channel output envelopes Ey[1] to Ey[N] by the estimation processing Sa or the learning processing Sb of the N-channel sound signals A[1] to A[N] received from the terminal apparatus. In a configuration in which the N-channel observed envelopes Ex[1] to Ex[N] are transmitted from the terminal apparatus, the envelope obtainer 311 or the envelope obtainer 321 receives the N-channel observed envelopes Ex[1] to Ex[N] from the terminal apparatus.

The display controller 33 of the audio processing system 10 generates image data representing the analysis image Z in accordance with the N-channel observed envelopes Ex[1] to Ex[N], the mix matrix Q, and the N-channel output envelopes Ey[1] to Ey[N], to transmit the image data to the terminal apparatus, thereby causing the terminal apparatus to display the analysis image Z. The audio processor 34 of the audio processing system 10 transmits the sound signal B generated by the audio processing for each sound signal A[n] to the terminal apparatus.

(7) In the above-described embodiments, an example is given of the audio processing system 10 with the estimation processor 31, the learning processor 32, the display controller 33, and the audio processor 34. However, some elements of the audio processing system 10 may be omitted. For example, in a configuration where the mix matrix Q generated by an external device is supplied to the audio processing system 10, the learning processor 32 is omitted. One or both of the display controller 33 and the audio processor 34 may be omitted. A device having the learning processor 32, which generates the mix matrix Q, is also referred to as a machine learning device. A system having the display controller 33, which displays the analysis image Z, is also referred to as a display control system.

(8) The functions of the audio processing system 10 described above are realized by coordination of one or more processors constituting the controller 11, and programs (the programs P1 to P4) stored in the storage device 12, as described above. The program according to the present disclosure may be stored on a computer-readable recording medium and installed in a computer. The recording medium is, for example, a non-transitory recording medium, and an optical recording medium (optical disc), such as a CD-ROM, is a good example, but any known form of recording medium, such as a semiconductor recording medium or magnetic recording medium, is also included. A non-transitory recording medium includes any recording medium except for transitory and propagating signals, and volatile recording media are not excluded. In a configuration where the distribution apparatus delivers the program via a communication network, a storage device that stores the program in the distribution apparatus corresponds to the above-described non-transitory recording medium.

E: Appendix

The following configurations are derivable from the embodiments and modifications illustrated above, for example.

Aspect A

The technology of Patent Document 1 is subject to a problem in that a large processing load is required for estimating the transmission characteristics of spill sound occurring between respective sound sources. On the other hand, cases are assumed in which sound separation for each sound source is not required. In such cases, it suffices if the sound level of each sound source can be obtained. In consideration of the above circumstances, an object of one aspect (Aspect A) of the present disclosure is to reduce a processing load in obtaining sound levels of sound sources.

An audio processing method according to one aspect (Aspect A1) of the present disclosure includes: obtaining a plurality of observed envelopes of picked-up sound signals including a first observed envelope and a second observed envelope, the first observed envelope representing a contour of a first sound signal picked up in a vicinity of a first sound source and the second observed envelope representing a contour of a second sound signal picked up in a vicinity of a second sound source, the first sound signal including a first target sound from the first sound source and a second spill sound from the second sound source; and the second sound signal including a second target sound from the second sound source and a first spill sound from the first sound source; and generating, based on the plurality of observed envelopes, a plurality of output envelopes using a mix matrix including a mix proportion of the second spill sound in the first sound signal (first observed envelope) and a mix proportion of the first spill sound in the second sound signal (second observed envelope). The generated plurality of output envelopes includes a first output envelope representing a contour of the first target sound in the first observed envelope and a second output envelope representing a contour of the second target sound in the second observed envelope.

In the above aspect, the plurality of output envelopes including the first output envelope representing the contour of the first target sound in the first observed envelope and the second output envelope representing the contour of the second target sound in the second observed envelope are generated. Accordingly, it is possible to accurately perceive the temporal changes in the sound levels of each of the first and second sound sources. Further, since an observed envelope representing a contour of a sound signal is processed, the processing load is reduced compared to a configuration in which the sound signal is processed.

"Obtaining an observed envelope" includes both generation of the observed envelope by signal processing of a sound signal and reception of the observed envelope generated by other devices. Further, "a first output envelope representing a contour of a first target sound in a first observed envelope" means an envelope obtained by reducing spill sound from a sound source other than the first sound source in (ideally, removing the spill sound) the first observed envelope. The same applies to the second observed envelope and the second output envelope.

In an example (Aspect A2) of Aspect A1, the generating of the plurality of output envelopes includes generating the mix matrix, which is non-negative and prepared in advance, and a non-negative coefficient matrix representative of the plurality of output envelopes, by applying Non-negative Matrix Factorization on a non-negative observed matrix representative of the plurality of the observed envelopes, the Non-negative Matrix Factorization using the mix proportion trained in advance by machine-learning processing. The above aspect has an advantage in that it is possible to easily generate a non-negative coefficient matrix representing the plurality of output envelopes by Non-negative Matrix Factorization of an observed matrix representing the plurality of observed envelopes.

In an example (Aspect A3) of Aspect A1 or Aspect A2, for each of a plurality of analysis periods on a time axis, the obtaining of the plurality of the observed envelopes and the generation of the plurality of output envelopes are performed sequentially in conjunction with pick-up of sound from the first sound source and the second sound source. In the above aspect, the obtaining of the plurality of observed envelopes and the generation of the plurality of output envelopes are performed sequentially in conjunction with pick-up of sound of the first and second sound signals. Therefore, it is possible to perceive temporal changes in the sound levels from each of the first and second sound sources in real time.

In an example (Aspect A4) of Aspect A3, in each of the plurality of analysis periods, a series of levels representing each of output envelopes is calculated using the mix matrix and the plurality of observed envelopes. According to the above aspect, the delay of the first and second output envelopes relative to the sound production by the first and second sound sources can be substantially reduced.

In an example (Aspect A5) of Aspect A4, for each unit period, the level of the first observed envelope in the respective unit period and the level of the first output envelope in the respective unit period are displayed on a display device. According to the above aspect, the user can view the relationship between the level of the first observed envelope and the level of the first output envelope without delay relative to the sound production by the first and second sound sources.

An audio processing method according to one aspect (Aspect A6) of the present disclosure includes: obtaining a plurality of observed envelopes including a first observed envelope and a second observed envelope, the first observed envelope representing a contour of a first sound signal picked up in a vicinity of a first sound source and the second observed envelope representing a contour of a second sound signal picked up in a vicinity of a second sound source, the first sound signal including a first target sound from the first sound source and a second spill sound from the second sound source; and the second sound signal including a second target sound from the second sound source and a first spill sound from the first sound source; and generating, based on the plurality of observed envelopes, a plurality of output envelopes including a first output envelope and a second output envelope, the first output envelope representing a contour of the first target sound in the first observed envelope and the second output envelope representing a contour of the second target sound in the second observed envelope, the plurality of output envelopes being generated from a mix matrix including a mix proportion of the second spill sound in the first sound signal and a mix proportion of the first spill sound in the second sound signal.

In the above method, a mix matrix that includes the mix proportion of the second spill sound in the first sound signal and the mix proportion of the first spill sound in the second sound signal is generated from the plurality of observed envelopes. Thus, it is possible to evaluate an extent to which the sound signal corresponding to each sound source contains the spill sound from other sources (the level of sound spill). Further, since an observed envelope that represents the contour of a sound signal is processed, the processing load is reduced compared to a configuration in which the sound signal is processed.

An audio processing system according to one aspect (Aspect A7) of the present disclosure includes: an envelope obtainer configured to obtain a plurality of observed envelopes of picked-up sound signals including a first observed envelope and a second observed envelope, the first observed envelope representing a contour of a first sound signal picked up in a vicinity of a first sound source and the second observed envelope representing a contour of a second sound signal picked up in a vicinity of a second sound source, the first sound signal including a first target sound from the first sound source and a second spill sound from the second sound source; and the second sound signal including a second target sound from the second sound source and a first spill sound from the first sound source; and a signal processor configured to generate, based on the plurality of observed envelopes, a plurality of output envelopes using a mix matrix including a mix proportion of the second spill sound in the first sound signal and a mix proportion of the first spill sound in the second sound signal. The generated plurality of output envelopes includes a first output envelope representing a contour of the first target sound in the first observed envelope and a second output envelope representing a contour of the second target sound in the second observed envelope.

A program according to one aspect (Aspect A8) of the present disclosure causes a computer to function as: an envelope obtainer configured to obtain a plurality of observed envelopes including a first observed envelope and a second observed envelope, the first observed envelope representing a contour of a first sound signal picked up in a vicinity of a first sound source and the second observed envelope representing a contour of a second sound signal picked up in a vicinity of a second sound source, the first sound signal including a first target sound from the first sound source and a second spill sound from the second sound source, and the second sound signal including a second target sound from the second sound source and a first spill sound from the first sound source; and a signal processor configured to generate, based on the plurality of observed envelopes, a plurality of output envelopes using a mix matrix including a mix proportion of the second spill sound in the first sound signal and a mix proportion of the first spill sound in the second sound signal. The generated plurality of output envelopes includes a first output envelope representing a contour of the first target sound in the first observed envelope and a second output envelope representing a contour of the second target sound in the second observed envelope.

Aspect B

In music production situations that involve mixing, for example, it is necessary for a user to take into consideration an effect of spill sound in sound received by sound receivers. However, the technology disclosed in Patent Document 1 does not enable a user to perceive an influence of spill sound in sound from sound sources. In consideration of the above circumstances, an object of one aspect (Aspect B) of the present disclosure is to enable a user to visually perceive an influence of spill sound on sound from sound sources.

A display control method according to one aspect (Aspect B1) of the present disclosure includes: obtaining, for each of a plurality of different sound sources, an observed envelope representing a contour of a sound signal picked up in a vicinity of from the sound source in the vicinity, a mix proportion of spill sound from another sound source relative to the sound from the sound source in the observed envelope (sound signal), and an output envelope representing a contour of the sound from the sound source in the observed envelope; and for each of one or more second sound sources other than a first sound source among the plurality of sound sources, displaying on a display device a first image representing a level of a second spill sound in an observed envelope of the first sound source based on the mix matrix and the output envelope obtained for each of the plurality of sound sources. A plurality of observed envelopes obtained for the plurality of different sound sources includes a first observed envelope for the first sound source, a second observed envelope for one of the second sound sources, and a third observed envelope for another of the second sound sources (i.e., a third sound source for a third sound source). In this case, a first image representing a level of a second spill sound from the second sound source in the first observed envelope and a level of a third spill sound from the third sound source in the first observed envelope is displayed on the based on display device.

In the above aspect, for each second sound source, the first image representing the level of the second spill sound in the observed envelope of the first sound source is displayed on the display device. Therefore, the user can visually perceive an extent of influence of each second spill sound in the sound signal generated by picking up the first target sound.

"Obtaining an observed envelope" includes both generating the observed envelope by signal processing of a sound signal and receiving the observed envelope generated by other devices. Similarly, "obtaining a mix proportion" includes both generating the mix proportion by signal processing and receiving the mix proportion from other devices. "Obtaining an output envelope" includes both generating the output envelope by signal processing and receiving the output envelope from other devices. Further, "an output envelope that represents a contour of sound from a sound source in the observed envelope" means an envelope obtained by reducing a spill sound from a sound source other than the sound source in (ideally, removing the spill sound from) the observed envelope.

A display control method according to one aspect (Aspect B2) of the present disclosure includes: obtaining, for each of a plurality of different sound sources, an observed envelope representing a contour of a sound signal generated by picking up sound from a sound source, a mix proportion of spill sound from another sound source relative to the sound from the sound source in the observed envelope (sound signal), and an output envelope representing a contour of the sound from the sound source in the observed envelope; and displaying, for each of one or more second sound sources other than a first sound source among the plurality of sound sources, a second image representing a level of a first spill sound in the observed envelope of the second sound source on a display device based on the mix proportion and the output envelope obtained for each of the plurality of sound sources. A plurality of observed envelopes obtained for the plurality of different sound sources includes a first observed envelope for the first sound source, a second observed envelope for one of the second sound sources, and a third observed envelope for another of the second sound sources (i.e., a third sound source for a third sound source). In this case, a second image representing a level of a first spill sound from the first sound source in the second observed envelope and a level of a spill sound from the first sound source in the third observed envelope is displayed on the display device. The third observed envelope represents a contour of a third signal picked up in a vicinity of the third sound source.

In the above aspect, for each second sound source, a second image representing the level of the first spill sound in the observed envelope of the second sound source is displayed on the display device. Therefore, the user can visually perceive an extent of influence of the first spill sound on the sound signal generated by picking up each second target sound.

In an example (Aspect B3) of Aspect B1 or Aspect B2, for each of the plurality of sound sources, a third image in which there is arranged a mix proportion of sound from the sound source and spill sound from another sound source, is displayed on the display device. In the above aspect, for each of the plurality of sound sources, a third image is displayed in which there is arranged a mix proportion of the sound from one source and the spill sound from another source. Therefore, for any combination of two sound sources among the plurality of sound sources, the user can visually perceive an extent to which one of the sound sources in the combination affects the other sound source.

In an example (Aspect B4) of any one of Aspect B1 to Aspect B3, for one of the plurality of sound sources, a fourth image representing a level of an observed envelope of the sound source and a level of an output envelope of the sound source are displayed on the display device. In the above aspect, the fourth image representing the level of the observed envelope and the level of the output envelope of one of the plurality of sound sources is displayed. Therefore, it is possible to visually compare the sound level from one source with the level of the spill sound from the other sources.

In an example (Aspect B5) of Aspect B4, for each unit period in which a single level in the observed envelope is calculated, a level of the observed envelope in the unit period and a level of the output envelope in the unit period are displayed on a display device. According to the above method, the user can view the relationship between the level of the first observed envelope and the level of the first output envelope without delay relative to the sound production by the sound source.

A display control system in accordance with one aspect (Aspect B6) of the present disclosure includes an estimation processor configured to obtain, for each of a plurality of different sound sources, an observed envelope representing a contour of a sound signal picked up in a vicinity of the sound source, a mix proportion of spill sound from another sound source relative to the sound from the sound source in the observed envelope (sound signal), and an output envelope representing a contour of the sound from the sound source in the observed envelope; and a display controller configured to display, for each of one or more second sound sources other than a first sound source among the plurality of sound sources, a first image representing a level of a second spill sound in the observed envelope of the first sound source on a display device based on the mix proportion and the output envelope obtained for each of the plurality of sound sources.

A display control system in accordance with one aspect (Aspect B7) of the present disclosure includes an estimation processor configured to obtain, for each of a plurality of different sound sources, an observed envelope representing a contour of a sound signal picked up in a vicinity of the sound source, a mix proportion of spill sound from another sound source relative to the sound from the sound source in the observed envelope (sound signal), and an output envelope representing a contour of the sound from the sound source in the observed envelope; and a display controller to display, for each of one or more second sound sources other than a first sound source among the plurality of sound sources, a second image representing a level of a first spill sound in the observed envelope of the second sound source on a display device based on the mix proportion and the output envelope obtained for each of the plurality of sound sources.

A program according to one aspect (Aspect B8) of the present disclosure causes a computer to function as an estimation processor configured to obtain, for each of a plurality of different sound sources, an observed envelope representing a contour of a sound signal picked up in a vicinity of the sound source, a mix proportion of spill sound from another sound source relative to the sound from the sound source in the observed envelope (sound signal), and an output envelope representing a contour of the sound from the sound source in the observed envelope; and a display controller configured to display, for each of one or more second sound sources other than a first sound source among the plurality of sound sources, a first image representing a level of a second spill sound in the observed envelope of the first sound source on a display device based on the mix proportion and the output envelope obtained for each of the plurality of sound sources.

A program for one aspect (Aspect B9) of the present disclosure causes a computer to function as: an estimation processor configured to obtain, for each of a plurality of different sound sources, an observed envelope representing a contour of a sound signal picked up in a vicinity of the sound source, a mix proportion of spill sound from another sound source relative to the sound from the sound source in the observed envelope (sound signal), and an output envelope representing a contour of the sound from the sound source in the observed envelope; and a display controller to display, for each of one or more second sound sources other than a first sound source among the plurality of sound sources, a second image representing a level of a first spill sound in the observed envelope of the second sound source on a display device based on the mix proportion and the output envelope obtained for each of the plurality of sound sources.

Aspect C

A variety of types of audio processing, such as effect processing, may be carried out on a sound signal based on the level of the signal. Such types of effect processing include gate processing that mutes a section of a sound signal in which a level is below a threshold, or compression processing that suppresses a section of a sound signal in which a level is above a threshold. If the sound signal includes spill sound, audio processing of the sound from a specific source may not be properly executed. In consideration of the above circumstances, an object of one aspect of the present disclosure (Aspect C) is to enable appropriate audio processing to be carried out on the sound signal after reducing an influence of spill sound.

An audio processing method according to one aspect (Aspect C1) of the present disclosure includes: obtaining an observed envelope representing a contour of a sound signal picked up in a vicinity of a sound source; generating from the observed envelope an output envelope representing a contour of the sound from the sound source in the observed envelope, and performing audio processing of the sound signal based on a level of the output envelope.

According to the above method, audio processing is performed on the sound signal based on the level of the output envelope, which represents a contour of the sound from the sound source in the observed envelope, so that appropriate audio processing can be performed on the sound signal by reducing an influence of the spill sound in the sound signal.

"Obtaining an observed envelope" includes both generation of the observed envelope by signal processing of the sound signal and reception of the observed envelope generated by other devices. Further, "an output envelope representing a contour of sound from a sound source in the observed envelope" means an envelope obtained by reducing spill sound from a sound source other than the sound source in (ideally, removing the spill sound from) the observed envelope.

In an example (Aspect C2) of Aspect C1, the audio processing includes dynamic control of a volume of the sound signal for a period of time that is set based on the level of the output envelope in the sound signal. In an example (Aspect C3) of Aspect C2, the dynamic control includes muting (gate processing of muting) the sound signal for a period in which the level of the output envelope is below a threshold. According to the above aspect, it is possible to effectively reduce the volume of the spill sound other than the sound in the sound signal. Also, in an example (Aspect C4) of Aspect C2 or Aspect C3, the dynamic control includes reducing (compression processing of reducing) a volume of the sound signal exceeding a predetermined value for a period in which the level of the output envelope exceeds a threshold. According to the above aspect, it is possible to effectively reduce the volume of the sound in the sound signal.

In an example (Aspect C5) of any one of examples from Aspect C1 to Aspect C4, the obtaining of the observed envelope includes, for each unit period, sequentially obtaining levels in the observed envelope, and the generating of the output envelope includes, for each unit period, generating a single level of the output envelope. According to the above aspect, it is possible to substantially reduce delay of the output envelope relative to the sound production by the sound source.

An audio processing method according to one aspect (Aspect C6) of the present disclosure includes: obtaining a plurality of observed envelopes including a first observed envelope and a second observed envelope, the first observed envelope representing a contour of a first sound signal picked up in a vicinity of a first sound source and the second observed envelope representing a contour of a second sound signal picked up in a vicinity of a second sound source, the first sound signal including a first target sound from the first sound source and a second spill sound from the second sound source; and the second sound signal including a second target sound from the second sound source and a first spill sound from the first sound source; and generating, based on the plurality of observed envelopes, a plurality of output envelopes including a first output envelope and a second output envelope, the first output envelope representing a contour of the first target sound in the first observed envelope and the second output envelope representing a contour of the second target sound in the second observed envelope, the plurality of output envelopes being generated using a mix matrix including a mix proportion of the second spill sound in the first sound signal (first observed envelope) and a mix proportion of the first spill sound in the second sound signal (second observed envelope); performing audio processing of the first sound signal based on a level of the first output envelope; and performing audio processing of the second sound signal based on a level of the second output envelope.

According to the above aspect, audio processing of the first sound signal based on the level of the first output envelope representing the contour of the first target sound in the first observed envelope is performed, and audio processing of the second sound signal based on the level of the second output envelope representing the contour of the second target sound in the second observed envelope is performed. Therefore, it is possible to perform appropriate audio processing by reducing an influence of spill sound in each of the first and second sound signals.

An audio processing system according to one aspect (Aspect C7) of the present disclosure includes: an envelope obtainer configured to obtain an observed envelope representing a contour of a sound signal picked up in a vicinity of a sound source; a signal processor configured to generate from the observed envelope an output envelope representing a contour of the sound from the sound source in the observed envelope; and an audio processor configured to perform audio processing of the sound signal based on a level of the output envelope.

A program according to one aspect (Aspect C8) of the present disclosure causes a computer to function as: an envelope obtainer configured to obtain an observed envelope representing a contour of a sound signal picked up in a vicinity of a sound source; a signal processor configured to generate from the observed envelope an output envelope representing a contour of the sound from the sound source in the observed envelope; and an audio processor configured to perform audio processing of the sound signal based on a level of the output envelope.

DESCRIPTION OF REFERENCE SIGNS

100 . . . audio system, 10 . . . audio processing system, 20 . . . playback device, D[n] (D[1] to D[N]) . . . sound receiver, 11 . . . controller, 12 . . . storage device, 13 . . . display device, 14 . . . input device, 15 . . . communication device, 31 . . . estimation processor, 311 . . . envelope obtainer, 312 . . . signal processor, 32 . . . learning processor, 321 . . . envelope obtainer, 322 . . . signal processor, 33 . . . display controller, 34 . . . audio processor, Z(Za, Zb, Zc, Zd) . . . analysis image.

What is claimed:

1. A computer-implemented audio processing method comprising:

obtaining a plurality of observed envelopes of picked-up sound signals including a first observed envelope representing a contour of a first sound signal picked up in a vicinity of a first sound source and a second observed envelope representing a contour of a second sound signal picked up in a vicinity of a second sound source, wherein:

the first sound signal includes a first target sound from the first sound source and a second spill sound from the second sound source, and the second sound signal includes a second target sound from the second sound source and a first spill sound from the first sound source;

generating, based on the plurality of observed envelopes, a plurality of output envelopes using a mix matrix including a mix proportion of the second spill sound in the first sound signal and a mix proportion of the first spill sound in the second sound signal, wherein the generated plurality of output envelopes include:

a first output envelope representing a contour of the first target sound in the first observed envelope; and a second output envelope representing a contour of the second target sound in the second observed envelope; and displaying on a display device an analysis image representing a level of the second spill sound in the first observed envelope based on the mix matrix and the plurality of output envelopes.

2. The computer-implemented audio processing method according to claim 1, wherein the generating of the plurality of output envelopes includes generating a non-negative coefficient matrix representative of the plurality of output envelopes by applying Non-negative Matrix Factorization on a non-negative observed matrix representative of the plurality of the observed envelopes, the Non-negative Matrix Factorization using the mix matrix trained in advance by machine-learning processing.

3. The computer-implemented audio processing method according to claim 1, wherein, for each of a plurality of analysis periods on a time axis, the obtaining of the plurality of the observed envelopes and the generating of the plurality of output envelopes are performed sequentially in conjunction with the pick-up of the sound signals.

4. The computer-implemented audio processing method according to claim 3, wherein, in each of the plurality of analysis periods, a series of levels representing each of output envelopes is calculated using the mix matrix and the plurality of observed envelopes.

5. The computer-implemented audio processing method according to claim 1, wherein:

the plurality of observed envelopes includes a third observed envelope representative of a contour of a third sound signal picked up in a vicinity of a third sound source, the first sound signal includes a third spill sound from the third sound source, and the analysis image further displays a level of the third spill sound from the third sound source in the first observed envelope based on the mix matrix and the plurality of output envelopes.

6. The computer-implemented audio processing method according to claim 1, wherein:

the plurality of observed envelopes includes a third observed envelope representative of a contour of a third sound signal picked up in a vicinity of a third sound source, and the analysis image further displays a level of the first spill sound in the second observed envelope and a level of a spill sound from the first sound source in the third observed envelope based on the mix matrix and the plurality of output envelopes.

7. The computer-implemented audio processing method according to claim 1, wherein the analysis image displays a mix proportion between the first target sound and the second spill sound, as the level of the second spill sound in the first observed envelope.

8. The computer-implemented audio processing method according to claim 1, wherein the analysis image displays a level of the first observed envelope and a level of the first output envelope.

9. The computer-implemented audio processing method according to claim 8, wherein, for each unit period in which a single level in the first observed envelope is calculated, the level of the first observed envelope in the respective unit period and the level of the first output envelope in the respective unit period are displayed on the display device.

10. The computer-implemented audio processing method according to claim 1, further comprising performing audio processing on the first sound signal based on a level of the first output envelope.

11. The computer-implemented audio processing method according to claim 10, wherein the audio processing includes dynamic control of a volume of the first sound signal for a period set based on the level of the first output envelope.

12. The computer-implemented audio processing method according to claim 11, wherein the dynamic control includes muting the first sound signal for a period in which the level of the first output envelope is below a threshold.

13. The computer-implemented audio processing method according to claim 11, wherein the dynamic control includes reducing a volume of the first sound signal that exceeds a predetermined value for a period in which the level of the first output envelope exceeds a threshold.

14. The computer-implemented audio processing method according to claim 10, wherein:

the obtaining of the plurality of observed envelopes includes, for each unit period, sequentially obtaining a level in each of the respective observed envelopes, and the generating of the plurality of output envelopes includes, for each unit period, generating a single level in each of the respective output envelopes.

15. An audio processing system comprising:

one or more memories storing instructions; and one or more processors communicatively connected to the one or more memories and that implement the instructions to:

obtain a plurality of observed envelopes of picked-up sound signals including a first observed envelope representing a contour of a first sound signal picked up in a vicinity of a first sound source and a second observed envelope representing a contour of a second sound signal picked up in a vicinity of a second sound source, wherein:

the first sound signal includes a first target sound from the first sound source and a second spill sound from the second sound source, and the second sound signal includes a second target sound from the second sound source and a first spill sound from the first sound source;

generate, based on the plurality of observed envelopes, a plurality of output envelopes using a mix matrix including a mix proportion of the second spill sound in the first sound signal and a mix proportion of the first spill sound in the second sound signal, wherein the generated plurality of output envelopes include:

a first output envelope representing a contour of the first target sound in the first observed envelope; and a second output envelope representing a contour of the second target sound in the second observed envelope; and, displaying on a display device an analysis image representing a level of the second spill sound in the first observed envelope based on the mix matrix and the plurality of output envelopes.

16. A computer-readable medium storing a program executable by a computer to execute an audio processing method comprising:

obtaining a plurality of observed envelopes of picked-up sound signals including a first observed envelope representing a contour of a first sound signal picked up in a vicinity of a first sound source and a second observed envelope representing a contour of a second sound signal picked up in a vicinity of a second sound source, wherein:

the first sound signal includes a first target sound from the first sound source and a second spill sound from the second sound source, and the second sound signal includes a second target sound from the second sound source and a first spill sound from the first sound source;

generating, based on the plurality of observed envelopes, a plurality of output envelopes using a mix matrix including a mix proportion of the second spill sound in the first sound signal and a mix proportion of the first spill sound in the second sound signal, wherein the generated plurality of output envelopes include:

a first output envelope representing a contour of the first target sound in the first observed envelope; and a second output envelope representing a contour of the second target sound in the second observed envelope; and displaying on a display device an analysis image representing a level of the second spill sound in the first observed envelope based on the mix matrix and the plurality of output envelopes.

17. The audio processing method according to claim 1, wherein the displaying of the analysis image includes displaying:

an image representing a level of the first target sound in the first observed envelope; and an image representing the level of the second spill sound in the first observed envelope.

18. The audio processing method according to claim 1, wherein the level of the second spill sound is obtained by multiplying the first mix proportion of the second spill sound in the first sound signal and a level of the second output envelope.

19. The audio processing method according to claim 1, wherein the displaying of the analysis image includes displaying an increased proportion of a level due to the second spill sound in the first observed envelope.

20. The audio processing method according to claim 7, wherein the analysis image displays:

the mix proportion between the first target sound and the second spill sound; and a mix proportion between the second target sound and the first spill sound.

* * * * *